US008171100B2

United States Patent
Zheng et al.

(12) United States Patent
(10) Patent No.: US 8,171,100 B2
(45) Date of Patent: May 1, 2012

(54) REDUCING LATENCY OF ACCESS REQUESTS IN DISTRIBUTED STORAGE SYSTEMS HAVING A SHARED DATA SET

(75) Inventors: Cindy Zheng, San Jose, CA (US); Rahul Khona, San Jose, CA (US); Amber Palekar, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/034,547

(22) Filed: Feb. 24, 2011

(65) Prior Publication Data

US 2011/0145189 A1    Jun. 16, 2011

Related U.S. Application Data

(63) Continuation of application No. 12/014,453, filed on Jan. 15, 2008, now Pat. No. 7,921,179.

(51) Int. Cl.
*G06F 17/30* (2006.01)
(52) U.S. Cl. ........... 709/213; 709/229; 707/10; 707/201
(58) Field of Classification Search .................. 709/213, 709/229; 707/10, 201
See application file for complete search history.

(56) References Cited

U.S. PATENT DOCUMENTS

| | | | | |
|---|---|---|---|---|
| 5,875,462 A * | 2/1999 | Bauman et al. | ............... | 711/119 |
| 6,718,347 B1 * | 4/2004 | Wilson | .................................. | 1/1 |
| 2005/0060330 A1 * | 3/2005 | Sonoda et al. | ............... | 707/100 |
| 2005/0144172 A1 * | 6/2005 | Kilian et al. | ..................... | 707/10 |
| 2006/0123424 A1 * | 6/2006 | Hunt et al. | ...................... | 719/310 |
| 2007/0168618 A1 * | 7/2007 | Clark et al. | ..................... | 711/141 |
| 2007/0198685 A1 * | 8/2007 | Phatak | .......................... | 709/223 |
| 2007/0204110 A1 * | 8/2007 | Guthrie et al. | ................ | 711/141 |
| 2007/0204119 A1 * | 8/2007 | Murotani et al. | ............. | 711/161 |
| 2007/0250188 A1 * | 10/2007 | Kuhner et al. | .................. | 700/83 |
| 2008/0222212 A1 * | 9/2008 | Prasad et al. | .................. | 707/201 |

OTHER PUBLICATIONS

U.S. Appl. No. 12/014,453, filed Jan. 15, 2008, Zheng et al.

* cited by examiner

*Primary Examiner* — Wing Chan
*Assistant Examiner* — Tesfay Yohannes
(74) *Attorney, Agent, or Firm* — Stattler-Suh PC

(57) ABSTRACT

Described are methods and apparatus for reducing latency of read and write requests for a set of storage system sites having a shared data set. An owner site may directly write to the shared data set and contains current data regarding the shared data set. The remote sites may experience substantial latency when accessing the shared data set stored at the owner site. Synchronizing and caching methods may reduce overall read latency experienced at remote sites by periodically transmitting images of the shared data set to the remote sites. Also, a migration method may be used to change ownership of the shared data set from a current owner site (that may be receiving a relatively low number of read/write requests) to a new owner site (that may be receiving a relatively high number of read/write requests) to reduce the overall read and write latency experienced in the sites.

12 Claims, 22 Drawing Sheets

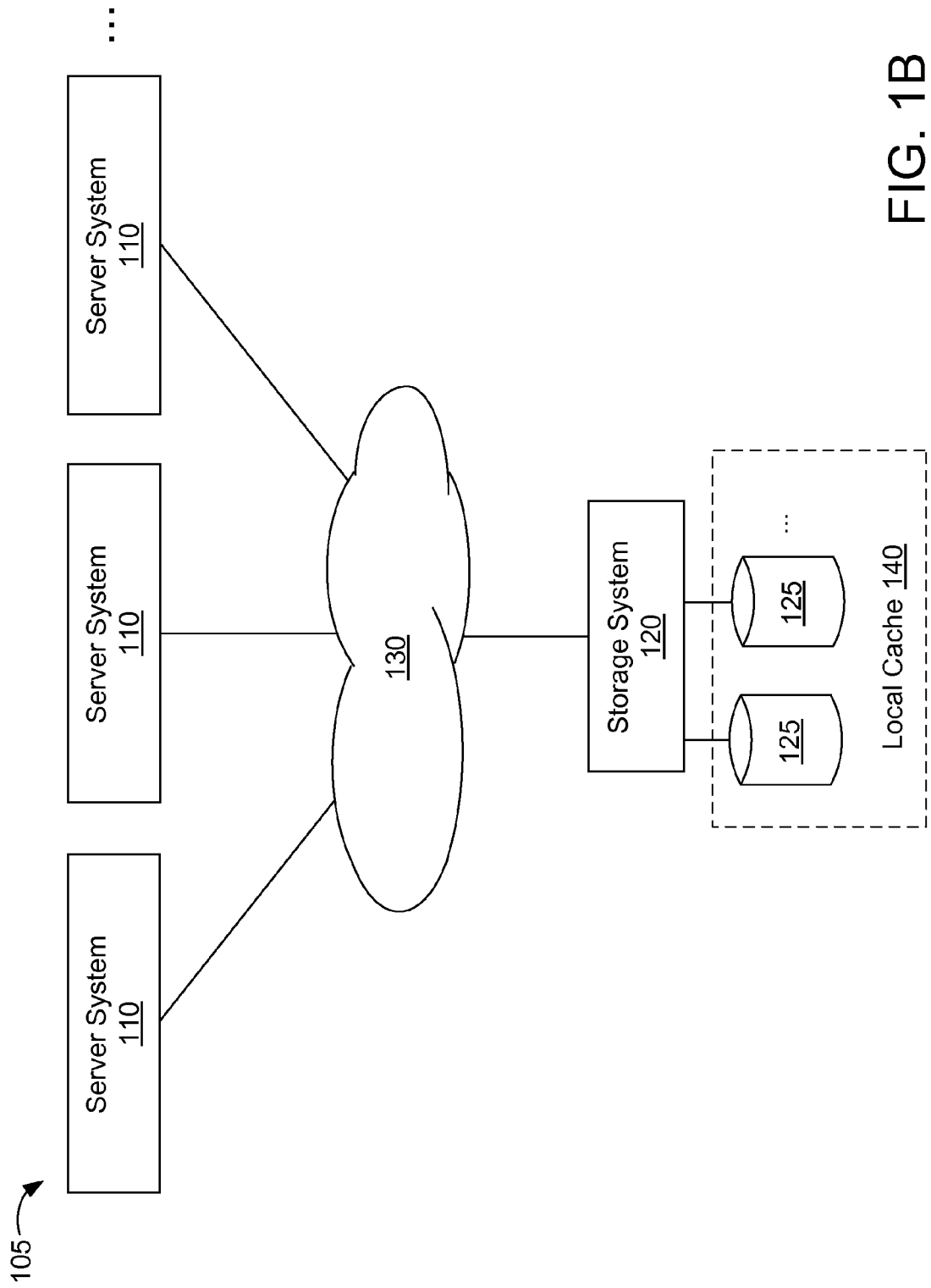

US 8,171,100 B2

REDUCING LATENCY OF ACCESS REQUESTS IN DISTRIBUTED STORAGE SYSTEMS HAVING A SHARED DATA SET

RELATED APPLICATIONS

This patent application claims benefit to and is a continuation of the U.S. patent application entitled "REDUCING LATENCY OF ACCESS REQUESTS IN DISTRIBUTED STORAGE SYSTEMS HAVING A SHARED DATA SET," having Ser. No. 12/014,453, filed Jan. 15, 2008 now U.S. Pat. No. 7,921,179.

FIELD OF THE INVENTION

Embodiments of the present invention relate to storage systems, and in particular, to reducing latency of access requests in distributed storage systems having a shared data set.

BACKGROUND

A storage system is a processing system adapted to store and retrieve information/data on storage devices (such as disks). The storage system includes a storage operating system that implements a file system to logically organize the information as a hierarchical structure of directories and files on the storage devices. Each file may be implemented as a set of blocks configured to store data/information (such as text), whereas each directory may be implemented as a specially-formatted file in which information about other files and directories are stored.

The storage operating system generally refers to the computer-executable code operable on a storage system that manages data access and access requests and may implement file system semantics in implementations involving storage systems. In this sense, the Data ONTAP® storage operating system, available from Network Appliance, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices (such as disks), defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow clients (e.g., users, server systems, applications, devices, etc.) to access its contents, for example, to read or write data to the storage system. The client may comprise an application executing on a server system that "connects" to the storage system over a computer network, such as a shared local area network (LAN), wide area network (WAN), or virtual private network (VPN) implemented over a public network such as the Internet. Communications between the storage system and its clients are typically embodied as packets sent over the computer network. A client may send an access request (read or write request) to the storage system for accessing particular data stored on the storage system. Each client may request the services of the storage system by issuing file-system protocol messages formatted in accordance with a conventional file-system protocol, such as the Common Internet File System (CIFS), Network File System (NFS) protocol, Fibre Channel Protocol (FCP), Internet Small Computer System Interface (iSCSI), or Storage Area Network (SAN) access.

An entity/organization may maintain and operate a set of storage system sites distributed through different geographic regions. Each site may include a storage system (with storage devices) connected with server systems that send access requests to the storage system. In some situations, the distributed sites each access (read or write to) a common set of data (referred to as a "shared data set") that is stored at one of the sites. Typically, the site that stores the shared data set (referred to as the "owner site") is the only site that may directly perform write operations on the shared data set (whereas the "remote sites" must write to the shared data set by proxy through the owner site). For example, an entity may have storage system sites in India and the U.S.A. that access a shared data set that is stored at the India site (the owner site).

Remote sites, however, may experience substantial latency/delay when reading from or writing to the shared data set stored at the owner site depending on the distance to the owner site and the size of the data being read or written. As such, there is a need for methods and apparatus for reducing the latency of read and write requests in distributed storage system sites having a shared data set.

SUMMARY

The embodiments described herein provide methods and apparatus for reducing latency of read and write requests for distributed storage system sites having a shared data set. In some embodiments, synchronizing and caching methods reduce overall read latency experienced by remote sites (i.e., all non-owner sites accessing the shared data set) by periodically transmitting images of the shared data set stored at the owner site to the remote sites. In some embodiments, a migration method is used to change ownership/storage of the shared data set from a current owner site (that may be receiving a relatively low number of read/write requests) to a new owner site (that may be receiving a relatively high number of read/write requests), whereby the overall read and write latency in the distributed sites is reduced.

In some embodiments, the synchronizing method works in conjunction with the caching method to reduce overall read latency experienced by remote sites. The synchronizing method periodically transmits images of the shared data set stored at the owner site to the remote sites. As such, the remote sites will have the data and storage objects (such as files) of the shared data set stored locally. However, the shared data set stored at a remote site may or may not be current since subsequent write operations may have been performed on the shared data set stored at the owner site. In some embodiments, when a remote site receives a read request specifying requested data from a storage object (such as a file), a caching method is used to determine whether the requested data stored locally at the remote site is current and thus may be retrieved locally (cache hit). In some situations under the caching method, a remote site may only need to request attributes of the file (metadata describing the file, such as when the file was last modified) specified in the read request from the owner site rather than requesting the actual requested data of the file. As the attributes of a file are typically much smaller in byte size than the actual requested data of the file, the latency period in retrieving the attributes of a file will typically be much shorter than when retrieving the requested data. As such, the overall read latency experienced by remote sites may be reduced.

As discussed above, an entity may maintain and operate a set of storage system sites distributed through different geographic regions, where the owner site storing the origin shared data set is the only site that may directly perform write operations on the shared data set (whereas the remote sites must write to the shared data set by proxy through the owner site). Storage system sites may be located in different time zones, and thus are typically "active" (i.e., receive a substantial number of access requests) at different times. For example, a site is typically most active during the business hours of the time zone it is located. As such, it may be advantageous to continuously move ownership/storage of the shared data set to the site that is most active to reduce the overall read/write latency in the set of distributed sites.

By moving storage of the origin shared data set to the site that is currently receiving the highest number of read/write requests, the overall read/write latency in the set of distributed sites may be reduced as most of the read/write requests can then be performed locally at the owner site. However, it is not desirable to completely shut-down access to the shared data at each site while ownership is transferred. Such a shut-down of access may entail temporarily stopping the receiving/accepting of access requests from clients accessing the shared data set (such as a user or an application) and sending error messages to the clients that the shared data set is temporarily unavailable for access.

In some embodiments, a migration method is used to change the owner of the origin shared data set from a current owner site to a new owner site. In these embodiments, access requests from client are continued to be received and processed during the change of ownership of the shared data set. As such, the migration method provides to the clients a seamless and invisible transfer of ownership of the shared data set that does not require modification of the clients' operations or submittal of access requests.

The migration method may produce an image of the origin shared data set at the current owner site and send the image to the new owner site at time t0. The current owner site then receives and performs write requests on the origin shared data set and produces a change log for each write request describing the modification made on the origin shared data set. At time t1 transmission of the image to the new owner site completes, whereupon the current owner site sends the change logs of the modifications made on the origin shared data set between time t0 and t1. Each site then begins to block read/write requests to the shared data set by receiving read/write requests to the shared data set but not performing the requests, and producing records of the requests. At time t2 transmission of the change logs to the new owner site completes, whereupon each site sends the records of their received write requests to the new owner site. After time t2, the new owner site becomes the actual owner of the origin shared data set and begins integrating the change logs into the origin shared data set and performing received write requests.

In some embodiments, the synchronizing method may be used prior to changing ownership of the shared data set using the migration method. The synchronizing method may be used to periodically transmit images of the origin shared data set stored at the owner site to the remote sites to keep data at the remote sites (including the new owner site) close to the origin shared data set. If the synchronizing method is used, the difference in the data stored at the current owner site and the new owner site will be the changes to the origin shared data set stored at the current owner site since the last image was generated and transmitted to the new owner site. In these embodiments, upon initiation of the migration method, a delta image capturing this difference in the data is generated and transmitted from the current owner site to the new owner site.

In other embodiments, the synchronizing method is not used prior to the migration method and the migration method is implemented independent from and without assistance of the synchronizing method. In these embodiments, upon initiation of the migration method, a base image capturing the origin shared data set stored at the current owner site may be generated and transmitted to the new owner site. Note that the base image will typically be larger in byte size than a delta image that may be generated and transmitted if the synchronizing method is used. As such, use of the synchronizing method prior to use of the migration method may reduce the amount of time needed to perform the migration method since the larger-sized base image will take longer to transmit and store to the new owner site.

BRIEF DESCRIPTION OF THE DRAWINGS

FIG. 1B is a schematic diagram of an exemplary site that may be implemented in the distributed storage system environment of FIG. 1A;

DETAILED DESCRIPTION

The disclosure of United States Patent Application entitled "REDUCING LATENCY OF ACCESS REQUESTS IN DISTRIBUTED STORAGE SYSTEMS HAVING A SHARED DATA SET," having Ser. No. 12/014,453, filed on Jan. 15, 2008, is expressly incorporated herein by reference.

In the following description, numerous details and alternatives are set forth for purpose of explanation. However, one of ordinary skill in the art will realize that embodiments can be practiced without the use of these specific details. In other instances, well-known structures and devices are shown in diagram form to not obscure the embodiments with unnecessary detail.

As used herein, a "site" comprises a storage system (having storage devices) connected with a set of servers/clients that send access (read/write) requests to the storage system for accessing a shared data set. Two or more sites may access (read or write to) the shared data set. An owner site may directly write to the shared data set and stores an "origin" shared data set comprising the most current/up-to-date data regarding the shared data set. The term "owner" may be used to indicate a component residing at the owner site (e.g., owner storage system, owner server, owner software module, etc.). A remote site is a non-owner site accessing the shared data set and stores an image of the shared data set that may or may not contain the most current/up-to-date data regarding the shared data set. The term "remote" may be used to indicate a component residing at a remote site (e.g., remote storage system, remote server, remote software module, etc.). The embodiments below are described in relation to a file. In other embodiments, other types of storage objects may be used. As used herein, a storage object comprises any definable storage element, data container, or the like (such as a file, logical unit, volume, etc.).

The description that follows is divided into four sections. Section I describes a distributed storage system environment in which some embodiments operate. Section II describes a shared data set environment in which some embodiments operate. Section III describes synchronizing and caching methods for reducing overall read latency in the shared data set environment. Section IV describes an owner migration method for reducing write latency in the shared data set environment.

I. Storage System Environment

Distributed Storage Systems

Figure 1A:
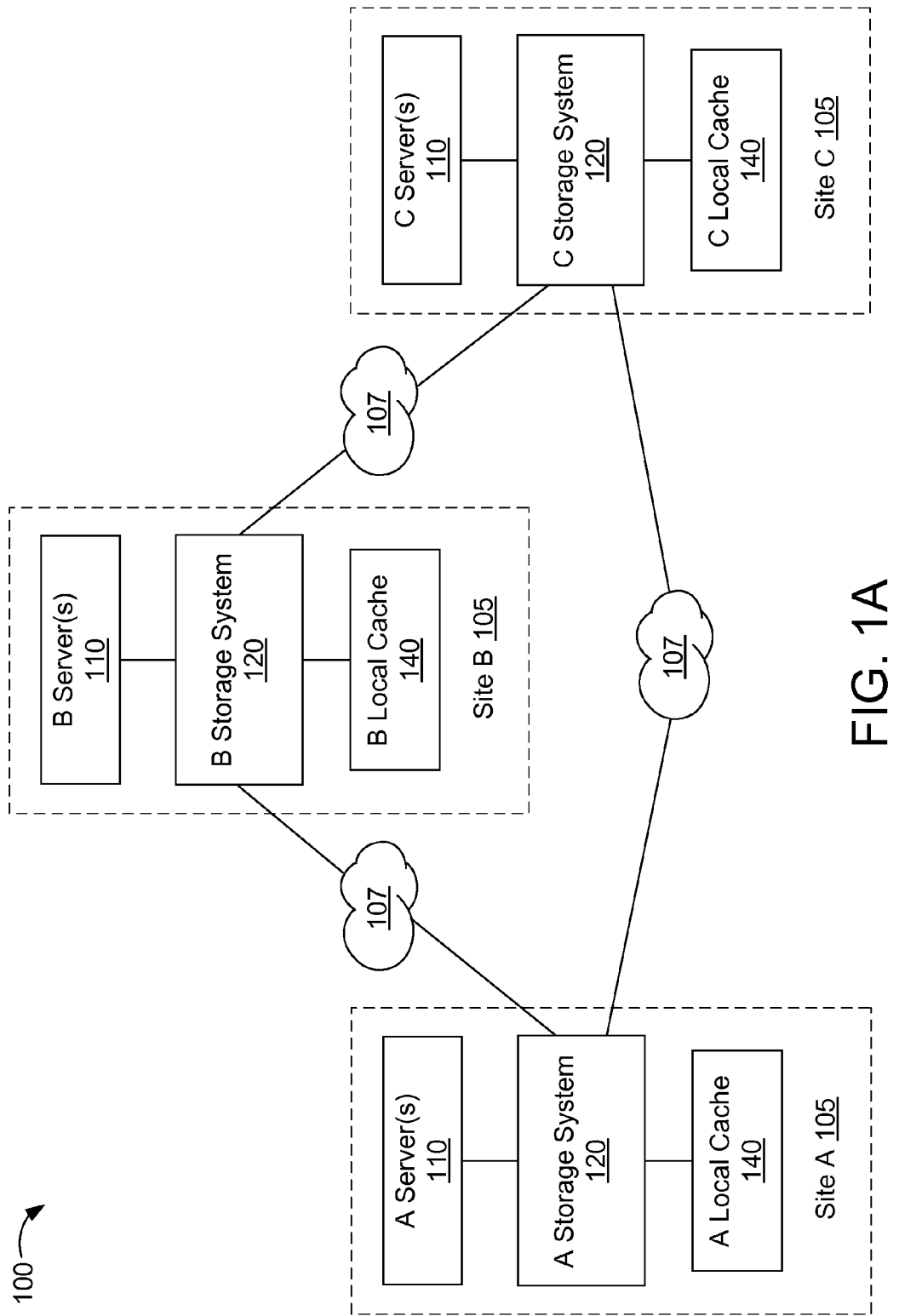
FIG. 1A is a schematic diagram of an exemplary distributed storage system environment in which some embodiments operate.

FIG. 1A is a schematic diagram of an exemplary distributed storage system environment 100 in which some embodiments operate. The environment 100 comprises a set of sites 105 (e.g., sites A, B, C) connected by a connection system 107. Each site 105 comprises a set of server systems 110, a storage system 120, and a local cache/storage 140. The connection system 107 may comprise a network, such as a Local Area Network (LAN), Wide Area Network (WAN), metropolitan area network (MAN), the Internet, or any other type of network or communication system between computer systems. In some embodiments, each site 105 may be located, for example, at great distances from each other and in different geographic regions (e.g., in different states, countries, etc.).

In these embodiments, the connection system 107 may comprise, for example, a WAN or the Internet. The various sites 105 may be connected with each other through the storage systems 120 of the various sites 105, whereby a storage system 120 of a site 105 is connected with each storage system 120 of each of the other sites 105. The storage systems 120 may communicate directly with each other to receive and send access (read/write) requests between the storage systems 120. The storage systems 120 may be considered peers in terms of network connectivity. In some embodiments, each storage system 120 may be identified by a unique identifier to distinguish each storage system 120 on the connection system 107. For example, each storage system 120 may be identified by an Internet Protocol (IP) address or domain name associated with the storage system 120 to locate the storage system 120 within a network. In the below embodiments, the unique identifiers of the storage systems 120 may be used, for example, to identify which storage systems 120 have particular delegations, which storage system 120 is a current owner of the origin shared data set, which storage system 120 is a new owner of the origin shared data set, etc.

FIG. 1B is a schematic diagram of an exemplary site 105 that may be implemented in the distributed storage system environment 100 of FIG. 1A. The site 105 comprises a set of server systems 110 connected to a storage system 120 by a connection system 130. The connection system 130 may comprise a network, such as a Local Area Network (LAN), Wide Area Network (WAN), metropolitan area network (MAN), the Internet, or any other type of network or communication system between computer systems. The storage system 120 includes a local cache/storage 140 comprising a set of one or more storage devices 125.

A server system 110 may comprise a computer system that utilizes services of the storage system 120 to store and manage data in the storage devices 125 of the storage system 120. Interaction between a server system 110 and the storage system 120 can enable the provision of storage services. That is, server system 110 may request the services of the storage system 120, and the storage system 120 may return the results of the services requested by the server system 110, by exchanging packets over the connection system 130. The server system 110 may request the services of the storage system 120 by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores and manages data in a set of storage devices 125 (local cache 140) that provide a set of storage volumes. The storage devices 125 may comprise writable storage device media, such as magnetic disks, video tape, optical, DVD, magnetic tape, and any other similar media adapted to store information, including data and parity information. As known in the art, a storage device 125 may have one or more storage volumes, where each volume has a file system implemented on the volume. A file system implemented on the storage device 125 may provide multiple directories in a single volume, each directory containing zero or more filenames. A file system provides a logical/virtual representation of how data (files) are organized on a volume, where data (files) are represented as filenames that are organized in one or more directories. Examples of common file systems include New Technology File System (NTFS), File Allocation Table (FAT), Hierarchical File System (HFS), Universal Disk Format (UDF), UNIX® file system, and the like. Each file may be implemented as a set of blocks configured to store information, whereas each directory may be implemented as a specially-formatted file in which information about other files and directories are stored. Although the embodiments herein are described in relation to a file. In other embodiments, other types of storage objects may be used (such as a logical unit, volume, etc.).

Server System

Figure 2:
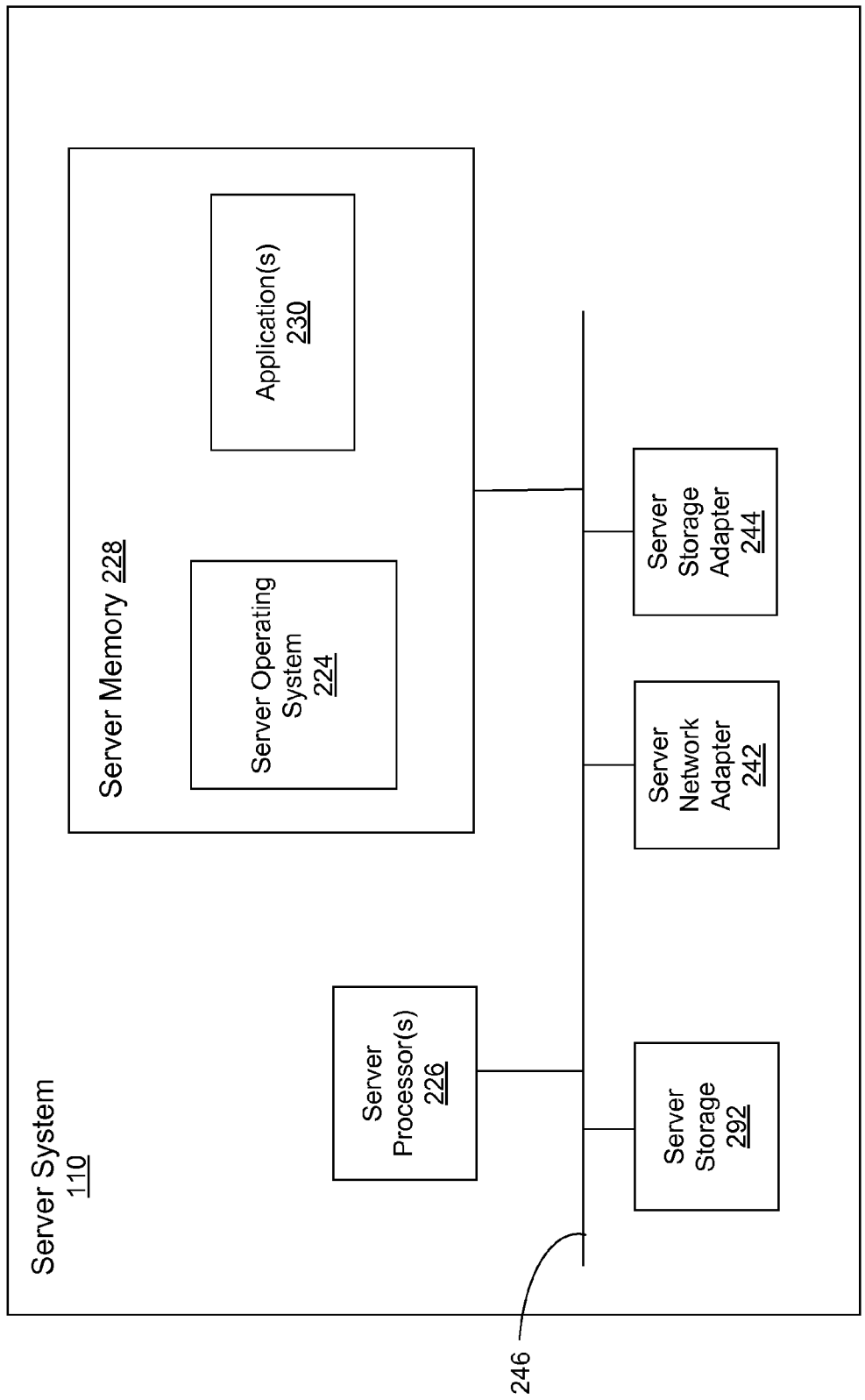
FIG. 2 is a diagram illustrating various components of the server system, in accordance with some embodiments.

FIG. 2 is a diagram illustrating various components of the server system 110, in accordance with some embodiments. The server system 110 comprises server processor(s) 226, server memory 228, a server network adapter 242, a server storage adapter 244, and a server storage 292 coupled by a bus 246.

The server processors 226 are the central processing units (CPUs) of the server system 110 and, thus, control the overall operation of the server system 110. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 228 comprises storage locations that are addressable by the processor 226 and adapters (a server network adapter 242 and a server storage adapter 244) for storing software program code, such as software described herein. The server processor 226 and server adapters may, in turn, comprise processing elements and/or logic circuitry configured to execute the software code. Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 242 comprises a plurality of ports adapted to couple the server system 110 to one or more other computer systems over point-to-point links, wide area networks, virtual private networks implemented over a public network (Internet) or a shared local area network. The server network adapter 242 thus may comprise the mechanical, electrical and signaling circuitry needed to connect the node to the network.

The server storage adapter 244 cooperates with a server operating system 224 executing on the server system 110 to access data from storage devices 125 of a storage system 120. The server storage adapter 244 comprises a plurality of ports having input/output (I/O) interface circuitry that couples to the storage devices 125 over an I/O interconnect arrangement (such as a fibre channel (FC) link topology).

Server storage 292 is a device that stores information within server system 110 (such as the server operating system 224, applications 230, and data). Server system 110 loads information stored on the server storage 292 into server memory 228 from which they are accessed by server processors 226.

As discussed above, server memory 228 comprises storage locations for storing software code that are addressable by the processor 226 for executing the software code. Such software code may include a server operating system 224 and one or more applications 230. The server operating system 224 can be, for example, UNIX®, Windows NT®, Linux®, or any other general-purpose operating system. An application 230 may comprise, for example, a storage management application that communicates with the storage system 120 to manage data stored on the local cache 140. An application 230 may comprise, for example, an email database application (such as Microsoft® Exchange Server provided by Microsoft Corp., of Redmond, Wash.) that maintains an email database stored on the local cache 140.

A user may interact with an application 230 (e.g., via a graphical user interface) to submit an access request that may specify a read or write operation to be performed on a particular range of blocks on a particular file. The application 230 may submit the access requests (read/write requests) to the storage system 120 for accessing (reading or writing to) particular blocks of particular files stored locally on the storage devices 125 (or stored remotely on storage devices 125 at a remote site). The user and/or application 230 that submits an access request is sometimes referred to herein as a client. The storage system 120 may receive and perform the access requests on the local storage devices 125 (or cause them to be performed on the storage devices 125 at a remote site).

Storage System

Figure 3:
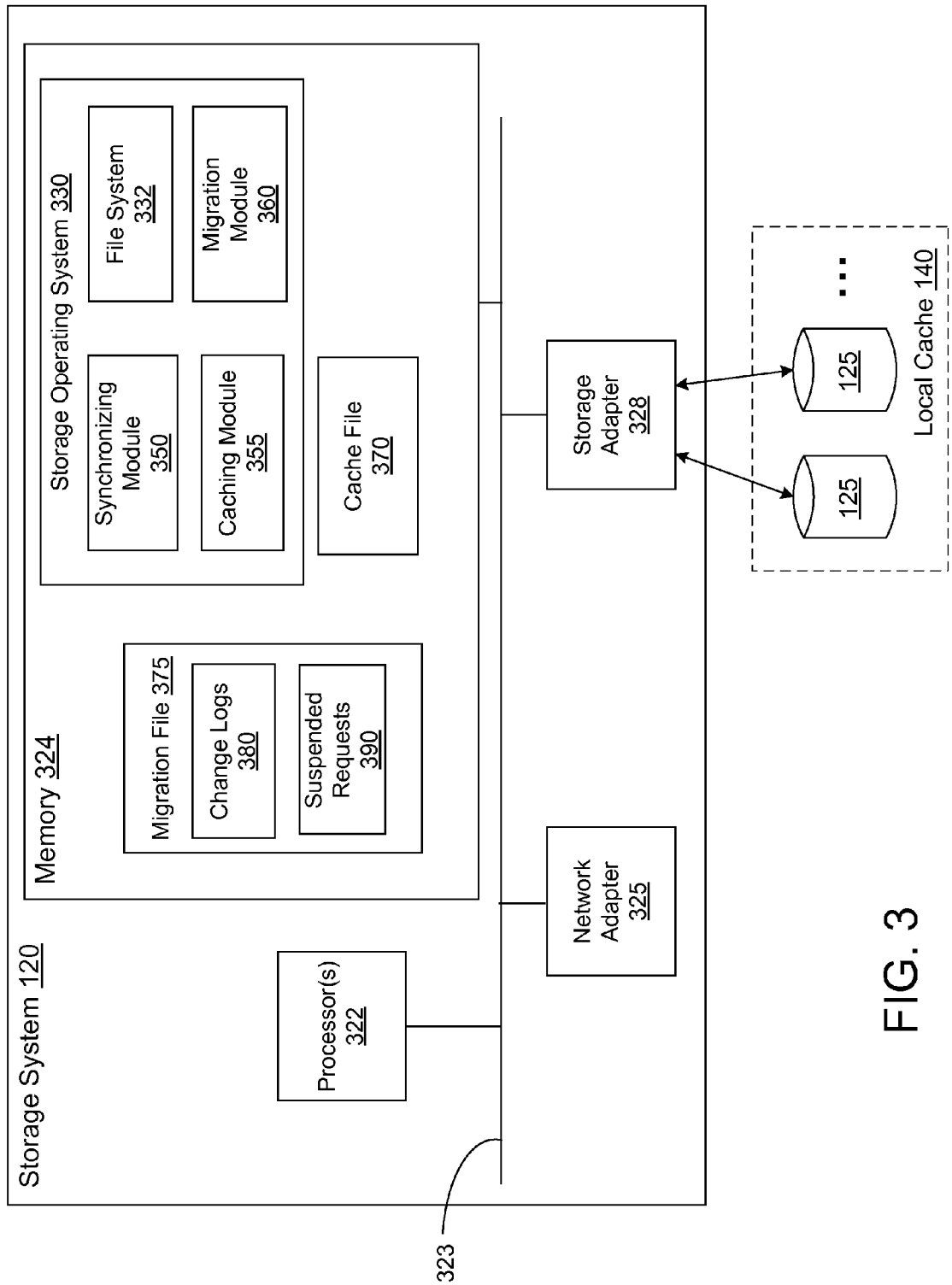
FIG. 3 is a diagram illustrating various components of the storage system, in accordance with some embodiments.

FIG. 3 is a diagram illustrating various components of the storage system 120, in accordance with some embodiments. Specifically, the storage system 120 comprises one or more processors 322, a memory 324, a network adapter 325, and a storage adapter 328 interconnected by a system bus 323.

The memory 324 comprises storage locations that are addressable by the processors 322 and adapters 325 and 328 for storing software program code (such as a storage operating system 330 and various software modules 350, 355, or 360) and data (such as cache file 370, migration file 375). The memory 324 may comprise a form of random access memory (RAM) that is generally cleared by a power cycle or other reboot operation (e.g., it is a "volatile" memory). In other embodiments, however, the memory 324 may comprise a non-volatile form of memory that does not require power to maintain information. The processor and adapters may, in turn, comprise processing elements and/or logic circuitry configured to execute the software code and manipulate various data.

The network adapter 325 comprises a plurality of ports adapted to couple the storage system 120 to a server system 110 or to another storage system 120 (located at another site 105) over point-to-point links, wide area networks, virtual private networks implemented over a public network (Internet) or a shared local area network. The storage adapter 328 is coupled with the storage devices 125 of the local cache 140 of the storage system and cooperates with a storage operating system 330 to access data on the storage devices 125. The storage adapter 328 comprises a plurality of ports having input/output (I/O) interface circuitry that couples to the storage devices 125 over an I/O interconnect arrangement.

The storage operating system 330, portions of which are typically resident in memory 324 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein. The storage system 120 executes the storage operating system 330 that implements a storage file system 332. In this sense, the Data ONTAP® storage operating system, available from Network Appliance, Inc. of Sunnyvale, Calif., that implements a Write Anywhere File Layout (WAFL®) file system, is an example of such a storage operating system 330 implemented as a microkernel within an overall protocol stack and associated storage. The storage operating system 330 can also be implemented as an application program operating over a general-purpose operating system, such as UNIX® or Windows®, or as a general-purpose operating system with configurable functionality, which is configured for storage applications as described herein.

The storage operating system 330 may be used to establish a connection (using the network adapter 325) between the storage system 120 and a server system 110 to receive access requests from the server system 110. The storage operating system 330 may also be used to establish a connection (using the network adapter 325) between the storage system 120 and another storage system 120 (located at another site 105) to send and receive access requests between the storage systems 120. A connection with the storage system 120 may be established using various connection protocols, such as the iSCSI or a Transport Control Protocol (TCP) protocols.

In some embodiments, the storage operating system 330 also includes a synchronizing module 350, a caching module 355, and a migration module 360. The synchronizing module 350 may be implemented to perform a synchronizing method to periodically synchronize a shared data set that is accessed by the set of distributed sites. In some embodiments, the synchronizing module 350 implements image/snapshot taking technology (e.g., Snapshot™ technology provided by Network Appliance of Sunnyvale, Calif.). The process of creating snapshots is described in U.S. Pat. No. 7,051,050 issued on May 23, 2006, entitled "System and Method for Restoring a Single File From a Snapshot," by Chen, et al., which is incorporated herein by reference. A snapshot image may comprise a persistent point in time (PPT) image of the active file system that enables quick recovery of data after data has been corrupted, lost, or altered. In some embodiments, the synchronizing module 350 generates and transmits images of the shared data set to the remote storage systems at predetermined time intervals automatically without human initiation or intervention.

The caching module 355 may be implemented to perform a caching method that works in conjunction with the synchronizing method to reduce read latency in the set of distributed sites. In some embodiments, the caching module 355 implements image caching technology (e.g., Flexcache™ technology provided by Network Appliance of Sunnyvale, Calif.). The Flexcache™ technology of some embodiments is further described in the U.S. patent application Ser. No. 11/409,625, entitled "System and Method for Caching Network File Systems," by Jason Lango et al. (assignee Network Appliance, Inc.), which is incorporated herein by reference. When performing the image caching method, the caching module 355 may generate, use, or store data to a cache file 370 that is, for example, stored to local cache 140 and loaded and stored to memory 324. The synchronizing module 350 and the caching module 355 are discussed in detail in Section III.

The migration module 360 may be implemented to perform a migration method to change ownership of the shared data set (from a current owner site to a new owner site) to reduce read and write latency in the set of distributed sites. In some embodiments, the migration module 360 implements image taking technology (e.g., Snapshot™ technology provided by Network Appliance of Sunnyvale, Calif.). When performing the migration method, the migration module 360 may generate, use, or store data to a migration file 375 that is, for example, stored to local cache 140 and loaded and stored to memory 324. In some embodiments, the migration file 375 comprises data regarding change logs 380 and suspended requests 390. The migration module 360 is discussed in detail in Section IV.

II. Shared Data Set Environment

Figure 4:
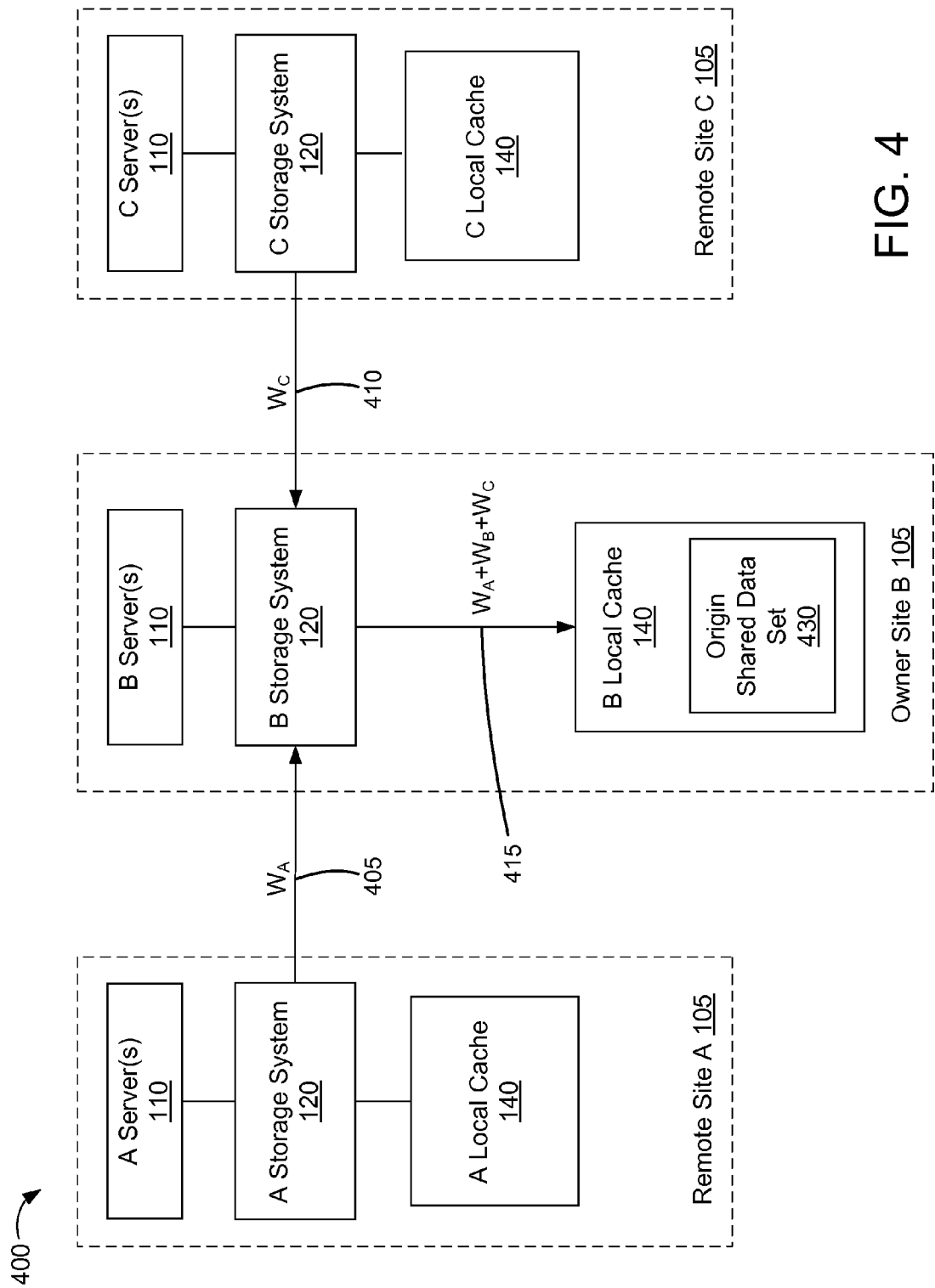
FIG. 4 shows a conceptual diagram of a shared data set environment in which some embodiments operate.

FIG. 4 shows a conceptual diagram of a shared data set environment 400 in which some embodiments operate. FIG. 4 is described in relation to FIG. 1A. As shown in FIG. 4, the shared data set environment 400 comprises a set of distributed sites 105 (e.g., sites A, B, C) connected with each other (e.g., via a network). For example, the sites 105 may be located at great distances from each other and be connected via a WAN or the Internet. Each site 105 comprises a set of server systems 110, a storage system 120, and a local cache/storage 140. The various sites 105 may be connected with each other through the storage systems 120 that may communicate directly with each other to exchange access (read/write) requests.

The set of distributed sites 105 may each access (read or write to) a same set of data that is shared among the set of sites, the same set of data being referred to as the "shared data set." In the set of distributed sites 105, one site (referred to as the owner site) stores the shared data set on its local cache 140 and may directly perform write operations on the shared data set stored in its local cache 140. Whereas, the other non-owner sites (referred to as remote sites) must write to the shared data set by proxy using the owner site (i.e., the remote sites must send write request to the owner site which then performs the write request on the shared data set stored on its local cache 140). Typically, only one site (the owner site) will be able to directly write to the shared data set to avoid data inconsistencies that may be incurred by multiple sites writing to the shared data set. As such, a single site (the owner site) manages and controls all write operations to the shared data set. As used herein, a write request comprises any request for modifying the shared data set in any way (e.g., for writing new data, deleting data, etc.). Write requests may be generated by applications 230 executing on servers 110 which then send the write requests to the storage systems 120.

The owner site receives all write requests from the remote sites (e.g., via a network) and performs all the received write requests (as well as performing its own write requests received from its own servers 110). To illustrate, as shown in the example of FIG. 4, the owner site is site B which stores the shared data set 430 and directly performs write requests on the shared data set 430. Owner site B receives write requests 405 (indicated as $W_A$) from remote site A and receives write requests 410 (indicated as $W_C$) from remote site C and performs all write requests 415 (indicated as $W_A+W_B+W_C$) on the shared data set 430 which includes the received write requests ($W_A+W_C$), as well as performing its own write requests ($W_B$). Since the owner site receives and performs all write requests on the shared data set (stored to its local cache 140), the shared data set stored on the owner site comprises the most current/up-to-date data of the shared data set. The most current/up-to-date shared data set stored on the owner site is sometimes referred to herein as the "origin" shared data set.

For an entity having sites in different geographic regions, having a shared data set among the sites may be advantageous. For example, a shared data set may be advantageous when it relates to the entity as a whole and not to only a specific site (e.g., where the shared data set comprises an email database for the entire entity). As a further example, a shared data set may be advantageous when it contains data for a project being jointly developed by several sites of the entity. For example, an entity may have sites located in India and U.S.A. where users at each site work on the joint project by reading and writing to the shared data set comprising data for the joint project.

A significant problem in distributed sites accessing a shared data set, however, is the read/write latency that may be experienced by remote sites when accessing the shared data set. When reading from or writing to the origin shared data set stored on the owner site, a remote site may experience substantial latency/delay depending on the physical distance to the owner site and the size of the data being read or written (since access latency is affected by distance of transmission and bandwidth size of the data to be transmitted). Although the owner site experiences at least some read/write latency as well when accessing the origin shared data set from its local cache 140, as used herein, read or write latency generally refers to the read or write latency experienced by remote sites when accessing the origin shared data set.

As discussed below in section III, synchronizing and caching methods may be used for reducing the overall read latency in the shared data set environment 400. As discussed below in section IV, an owner migration method may be used for reducing the overall read and write latency in the shared data set environment 400.

III. Synchronizing and Caching Methods for Reducing Read Latency

Typically, in the shared data set environment 400, when a remote site reads from the origin shared data set 430, it may experience substantial read latency. A remote storage system (located at a remote site) may receive a read request (e.g., from an application 230 executing on a server 110) for particular data, the particular data being specified in the read request by a particular block range of a particular file. The remote storage system then retrieves the requested data from the origin shared data set 430 stored at the owner site. Such retrieval of the requested data may experience substantial read latency depending on the distance to the owner site and the size of the data being read.

Conventionally, "pull-model" caching methods may be used to help reduce read latency experienced by remote sites. In pull-model caching, a remote site initially does not contain any data from the shared data set in its local cache 140 and begins storing such data in its local cache 140 as read requests are received and data from the shared data set are retrieved. In pull-model caching, when a remote storage system receives a read request for particular data, the remote storage system first checks if the requested data is stored in the local cache 140 of the remote storage system. If not a "cache miss" has occurred and the remote storage system retrieves the requested data from the owner site and stores the requested data in its local cache 140. If the remote storage system then receives another read request for the same particular data, the remote storage system may retrieve the requested data from its own local cache 140 (i.e., a "cache hit"), whereby the read latency incurred in retrieving the requested data from the owner site is avoided. However, the occurrence of a cache hit relies on the occurrence of a read request that has previously requested the same data. As such, cache misses often occur and, overall, remote sites still experience significant read latency under the pull-model caching methods.

In some embodiments, synchronizing and caching methods are used for reducing overall read latency experienced by remote sites in the shared data set environment. The synchronizing method may be used to periodically send data from the origin shared data set 430 (stored at the owner site) to the remote sites. In some embodiments, the synchronizing method generates and transmits images of the shared data set to the remote storage systems automatically without human initiation or intervention at predetermined time intervals. In some embodiments, the synchronizing method is initiated by the owner site that collects from the origin shared data set and transmits data to one or more remote sites without requiring an initiation/request from a remote site to do so. As such, the synchronizing method may be based on a "push-model" rather than a "pull-model". For example, the owner site may be configured to collect and transmit data at predetermined time intervals (e.g., every 15 minutes, every half hour, or every hour, etc.).

In some embodiments, the owner site is configured to implement image taking technology to generate an image of the origin shared data set 430 and transmit the image to the remote sites. In turn, the remote sites receive the image of the origin shared data set 430 and store the image to their local caches 140. As such, even before a first read request is received from a remote site, the remote site will have an image of all data of the origin shared data set 430 (referred to herein as the image of the shared data set) stored in its local cache 140. The owner site may then be configured thereafter to periodically generate images of any modifications/changes to the origin shared data set 430 (since a just previous image was generated) and transmit the images containing the changes to the remote sites. In some embodiments, the synchronizing method is performed by synchronizing modules 350 residing and executing on the owner and remote storage systems 120 that may operate in conjunction to perform the synchronizing method.

The image of the shared data set stored at a remote site, however, may or may not contain data that is current/up-to-date (since a write operation to the origin shared data set 430 may have occurred at the owner site after the last image of the shared data set was sent to the remote site). As such, when a read request is received by a remote site requesting data in the shared data set, the remote site may retrieve the request data from its local cache 140 depending on whether the requested data stored in its local cache 140 is current or not. In some embodiments, a caching method is used to determine whether requested data stored in a local cache 140 of a remote site is current and can be retrieved from the local cache 140 (cache hit), or whether the requested data is not current and must be retrieved from the owner site (cache miss).

In some situations, under the caching method, a remote site may only request attributes of a file specified in a read request (i.e., metadata describing the file) from the owner site rather than the actual requested data of the file. As the attributes of a file are typically much smaller in byte size than the actual requested data of the file, the latency period in retrieving the attributes of a file will typically be much shorter than when retrieving the requested data. As such, the overall read latency experienced by remote sites in the shared data set environment 400 may be reduced. In some embodiments, the caching method is performed by caching modules 355 residing and executing on the owner and remote storage systems 120 that may operate in conjunction to perform the caching method.

Synchronizing Module and Method

Figure 5:
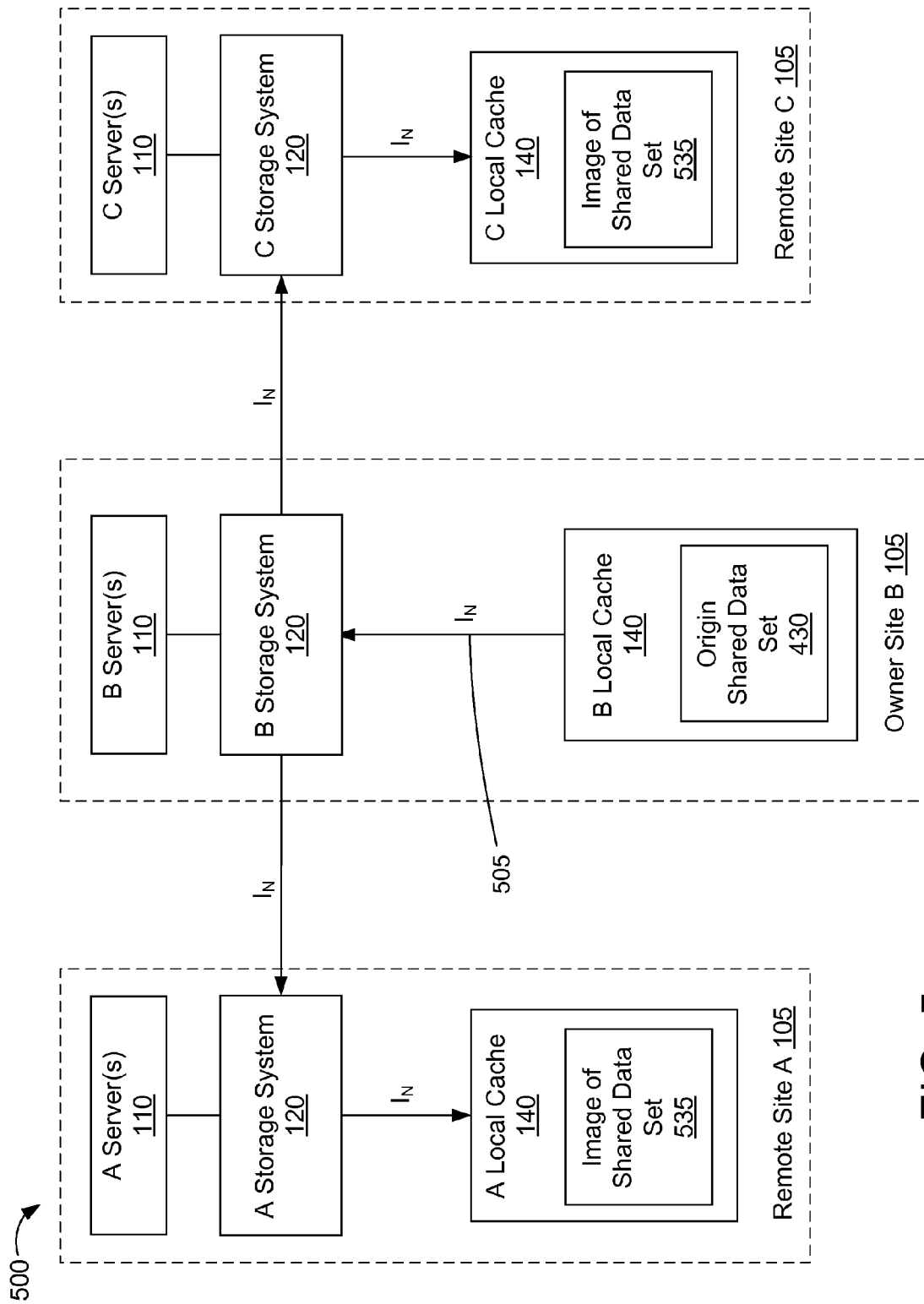
FIG. 5 shows a conceptual diagram of the operations of a synchronizing method that may be implemented in a shared data set environment.

FIG. 5 shows a conceptual diagram of the operations of a synchronizing method that may be implemented in a shared data set environment 400. The synchronizing method is performed by synchronizing modules 350 residing and executing on the owner and remote storage systems 120 that operate in conjunction to perform the synchronizing method. The synchronizing module 350 residing and executing on the owner storage system and owner site (e.g., site B) is referred to herein as the owner synchronizing module, whereas the synchronizing module 350 residing and executing on a remote storage system and remote site (e.g., sites A and C) is referred to herein as a remote synchronizing module.

The owner synchronizing module 350 may be configured to periodically generate an image ($I_N$) of the origin shared data set 430 (stored in the local cache 140 of the owner site) and transmit the image ($I_N$) to each remote storage system 120 of each remote site that shares the origin shared data set 430. The initial image generated by the owner synchronizing module 350 may comprise a "base image" that captures all data of the origin shared data set 430 at the point in time the base image is generated. A base image may be generated when no previous images of the origin shared data set 430 have been produced. The owner synchronizing module 350 may be configured thereafter to periodically generate "delta images" that capture any changes to the origin shared data set 430 that occurred since the last point in time that a just previous image of the origin shared data set 430 was generated.

The owner synchronizing module 350 may be configured to generate a delta image of the origin shared data set 430 using methods known in the art. For example, the delta image may be generated on a logical/file or volume/block based method. Using a logical/file based method (that implements the concept of files organized by a file system), the owner synchronizing module 350 may be configured to determine which files in the origin shared data set 430 have changed since the last image and determine which blocks of changed files have changed. The delta image may then contain data of all the changed blocks as well as a description of which file and block range the changed blocks are located in the origin shared data set 430. Using a volume/block based method (that does not implement the concept of a file system), the owner synchronizing module 350 may be configured to determine which blocks in the origin shared data set 430 have changed since the last image. The delta image may then contain data of all the changed blocks as well as a description of which block ranges the changed blocks are located in the origin shared data set 430. In other embodiments, the delta images may be generated using different methods.

To illustrate, the owner synchronizing module 350 may generate and transmit a base image $I_X$ at time=X, and then later (e.g., after a predetermined time period) generate a delta image $I_Y$ at time=Y, wherein delta image $I_Y$ contains all changes to the origin shared data set 430 since time=X. The owner synchronizing module 350 may then later (e.g., after the predetermined time period) generate another delta image $I_Z$ at time=Z, wherein delta image $I_Z$ contains all changes to the origin shared data set 430 since time=Y, and so forth. In some embodiments, the owner synchronizing module 350 is configured to generate and transmit images of the origin shared data set 430 without requiring an initiation/request from a remote site to do so. For example, the owner synchronizing module 350 may be configured to generate and transmit images at predetermined time intervals (e.g., every 15 minutes, every half hour, or every hour, etc.). In other embodiments, the owner synchronizing module 350 may be initiated by an administrator (e.g., through a user interface of the storage operating system 330) to generate and transmit images of the origin shared data set 430.

Each remote synchronizing module 350 residing at each remote storage system 120 may be configured to receive images ($I_N$) from the owner site and store the images ($I_N$) to their local caches 140. If the receive imaged is a base image, the remote synchronizing module 350 simply stores the base image to its local cache 140. If the receive imaged is a delta image, the delta image may contain data of all the changed blocks and a description of where each changed block is located in the origin shared data set 430. Using this information in the delta image, the remote synchronizing module 350 may be configured to integrate the changes captured in the delta image into the image currently stored to its local cache 140. A base image or integrated image (reflecting changes integrated from a delta image) is referred to herein as the image of the shared data set 535 (which is shown in FIG. 5 as being stored to each local cache 140 of each remote site).

Figure 6:
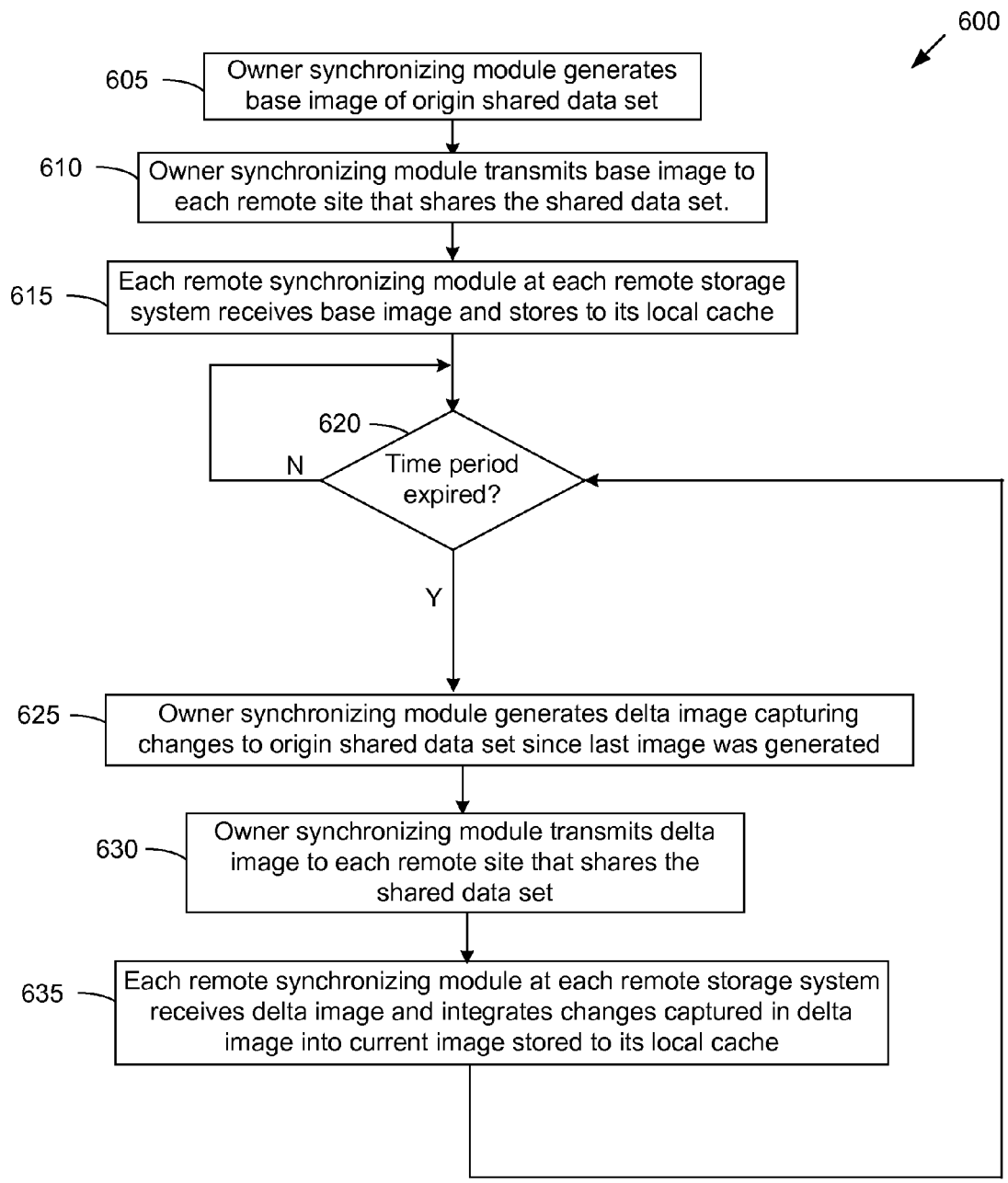
FIG. 6 is a flowchart of a synchronizing method for synchronizing a shared data set among a plurality of sites in a shared data set environment.

FIG. 6 is a flowchart of a synchronizing method 600 for synchronizing a shared data set among a plurality of sites 105 in a shared data set environment 400. In some embodiments, the method 600 is implemented by software or hardware. In some embodiments, the steps of method 600 are performed by various software components executing on the storage systems 120 of the various sites 105. For example, in some embodiments, the steps of method 600 may be performed by an owner operating system and owner synchronizing module 350 residing and executing on the owner storage system (that stores the origin shared data set 430) and a remote operating system and remote synchronizing module 350 residing and executing on a remote storage system. The order and number of steps of the method 600 are for illustrative purposes only and, in other embodiments, a different order and/or number of steps are used. Note that steps 605 through 615 of the method 600 are optional and are performed if a base image of the origin shared data set 430 has not yet been generated or is not available for use by the synchronizing modules 350.

If a base image of the origin shared data set 430 is not available for use, the owner synchronizing module generates (at 605) a base image of the origin shared data set 430 and transmits (at 610) the base image to each remote site that shares the shared data set. At step 615, each remote synchronizing module residing at each remote storage system 120 receives the base image from the owner site and stores the base image to its local cache 140. The method 600 then determines (at 620) whether a predetermined time period (e.g., 1 hour) has expired since the last image was generated. If not, the method 600 continues at 620. If so, the owner synchronizing module generates (at 625) a delta image that captures all changes to the origin shared data set 430 since the last image was generated and transmits (at 630) the delta image to each remote site that shares the shared data set. At step 635, each remote synchronizing module at each remote storage system 120 receives the delta image from the owner site and integrates the changes captured in the delta image (e.g., using data and locations of the changed blocks specified in the delta image) into the current image of the origin shared data set 430 stored to its local cache 140. The method 600 then continues at step 620 where it determines whether the predetermined time period has expired since the last image was generated.

As such, the synchronizing method 600 utilizes image taking technology and a push-model to periodically update the remote sites to keep the data stored at the remote sites synchronized (at predetermined time intervals) with the origin shared data set 430 stored at the owner site. In some embodiments, the synchronizing method 600 may be used in conjunction with the caching or migration methods (described below) to improve the caching or migration methods.

Caching Module and Method

As described above, using the synchronizing method 600, an image of the origin shared data set 430 generated and sent to each remote site. As such, even before a first read request is received from a remote site (e.g., from an application 230 executing on a server 110 of the remote site), the remote site will have an image of the shared data set 535 stored in its local cache 140. The image of the shared data set 535 stored at a remote site, however, may or may not contain data that is current/up-to-date (since a write operation to the origin shared data set 430 may have occurred at the owner site after the last image of the shared data set was sent to the remote site). As such, when a read request is received by a remote site requesting data in the shared data set, a caching method is used to determine whether requested data stored in a local cache 140 of a remote site is current and can be retrieved from the local cache 140 (cache hit), or whether the requested data is not current and must be retrieved from the owner site (cache miss).

Before discussing the caching method, some elements of file systems and command requests should be noted. As discussed above, the storage operating system 330 may implement a file system 332 that logically organizes information (such as the shared data set) as a hierarchical structure of directories and files on a set of storage devices. As known in the art, the file system 332 may assign a unique file identifier ("fileid") for each file in a given volume. Also, for each file, the file system 332 typically produces and stores attributes/metadata that describe the file. Examples of attributes stored for a file include the size of the file, when the file was created, when the file was last modified, etc. When changes occur to any data of the file (e.g., through write operations), the file system 332 modifies the file attributes to reflect these changes. The file system 332 typically generates and stores attributes that describe the entire file as a whole and does not store attributes regarding individual blocks in the file (such as when a particular block was last modified, etc.).

As such, the origin shared data set 430 stored at the owner site includes both the data of the files 755 (shown in FIG. 7B) and the attributes of the files 710 (shown in FIG. 7A) of the origin shared data set 430 (referred to as the owner data and owner attributes, respectively). Likewise, the image of the shared data set 535 stored to each local cache 140 of each remote site includes both the data of the files 765 (shown in FIG. 7B) and the attributes of the files 720 (shown in FIG. 7A) of the shared data set 535 (referred to as the remote data and remote attributes, respectively). Note that the owner data and attributes of the files of the origin shared data set 430 may differ from the remote data and attributes of the files of the shared data set 535 since write operations may have occurred on the owner data and attributes after the last image was generated and sent to the remote sites.

As known in the art, a read request is a command for a return of particular data that is specified by a particular block range of a particular file (e.g., as specified by a unique file identifier ("fileid")). Typically, in response to a read request, the requested data is returned as well as attributes of the file specified in the read request. As known in the art, an attribute request may comprise a read request having a specified file but with no specified block range (or a blank range of 0). As such, in response to an attribute request, only attributes of the file specified in the request are returned and not data is returned.

As known in the art, a delegation request may be included with a read request or an attribute request. For example, a remote storage system may send, to the owner storage system, a delegation request with a read request for a particular block range and file. In response, the owner storage system sends the requested data and a delegation indicator to the remote storage system. The delegation request and delegation indicator will be for the attributes of the file specified in the read request (referred to as the "delegated file"). As long as the remote storage system retains the delegation indicator, the delegation indicator ensures that the attributes of the delegated file are current and the delegated file has not been modified since the delegation indicator was given to the remote storage system. Note that similar to attributes, delegations are typically file-based and do not apply to particular blocks of a file (i.e., a delegation is for an entire file and not for specific blocks of a file).

If the owner storage system receives a write request and needs to modify the delegated file, the owner storage system will revoke the delegation indicator given to the remote storage system (e.g., by sending a message to the remote storage system indicating that the delegation indicator is no longer valid) and then perform the write operation on the delegated file. The owner operating system 330 will maintain a record of delegation indicators given for files and which remote storage systems (e.g., as identified by the IP addresses of the remote storage systems) received the delegation indicators for which files. Such delegation information may be, for example, stored in a cache file 370 in memory 324. Likewise, the remote operating system 330 will maintain a record of delegation indicators received for files and whether or not the delegation indicators have been revoked (e.g., as stored in a cache file 370 in memory 324).

Figure 7A:
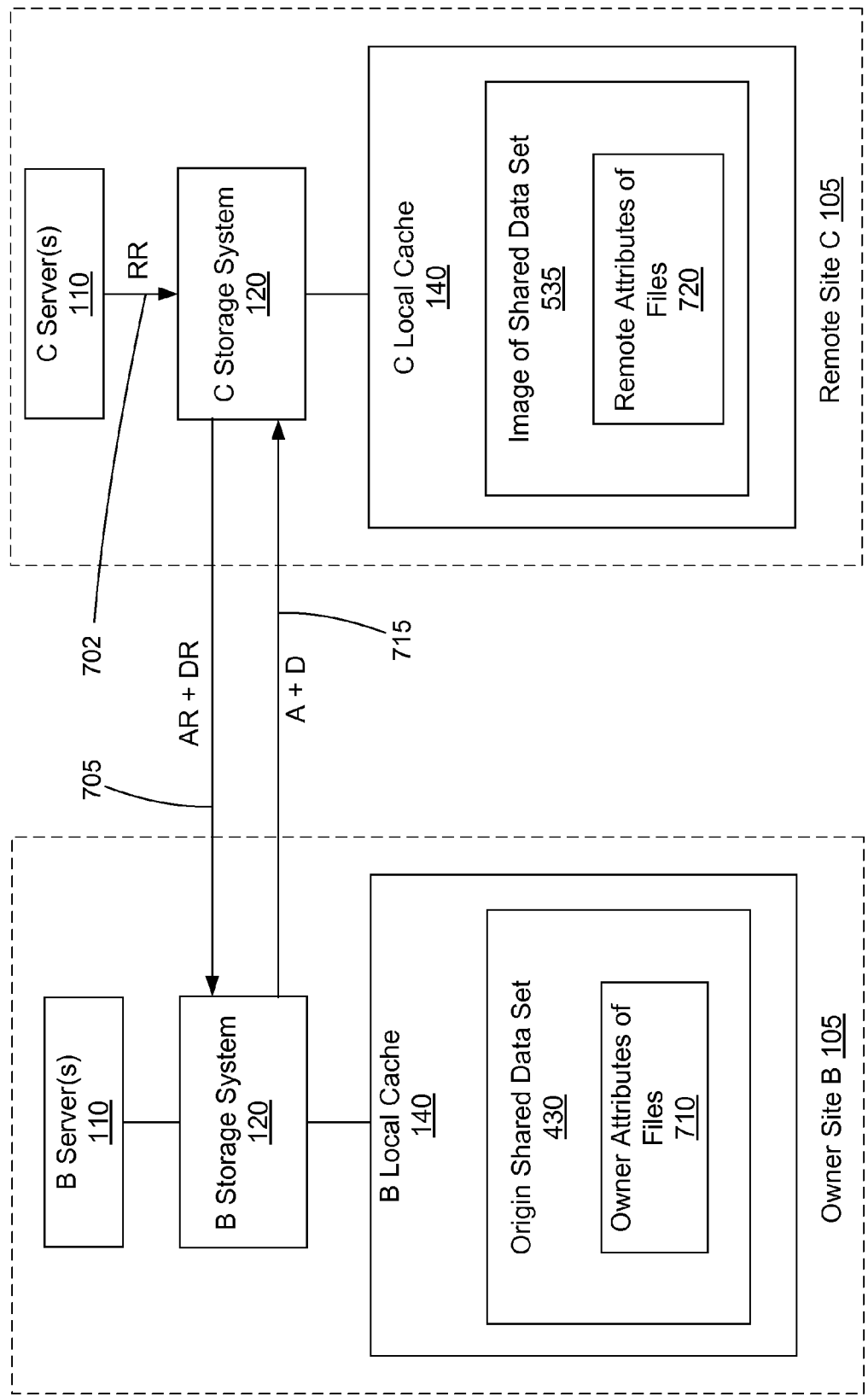
FIGS. 7A-B are conceptual diagrams of the operations of a caching method that may be implemented in conjunction with the synchronizing method.
Figure 7B:
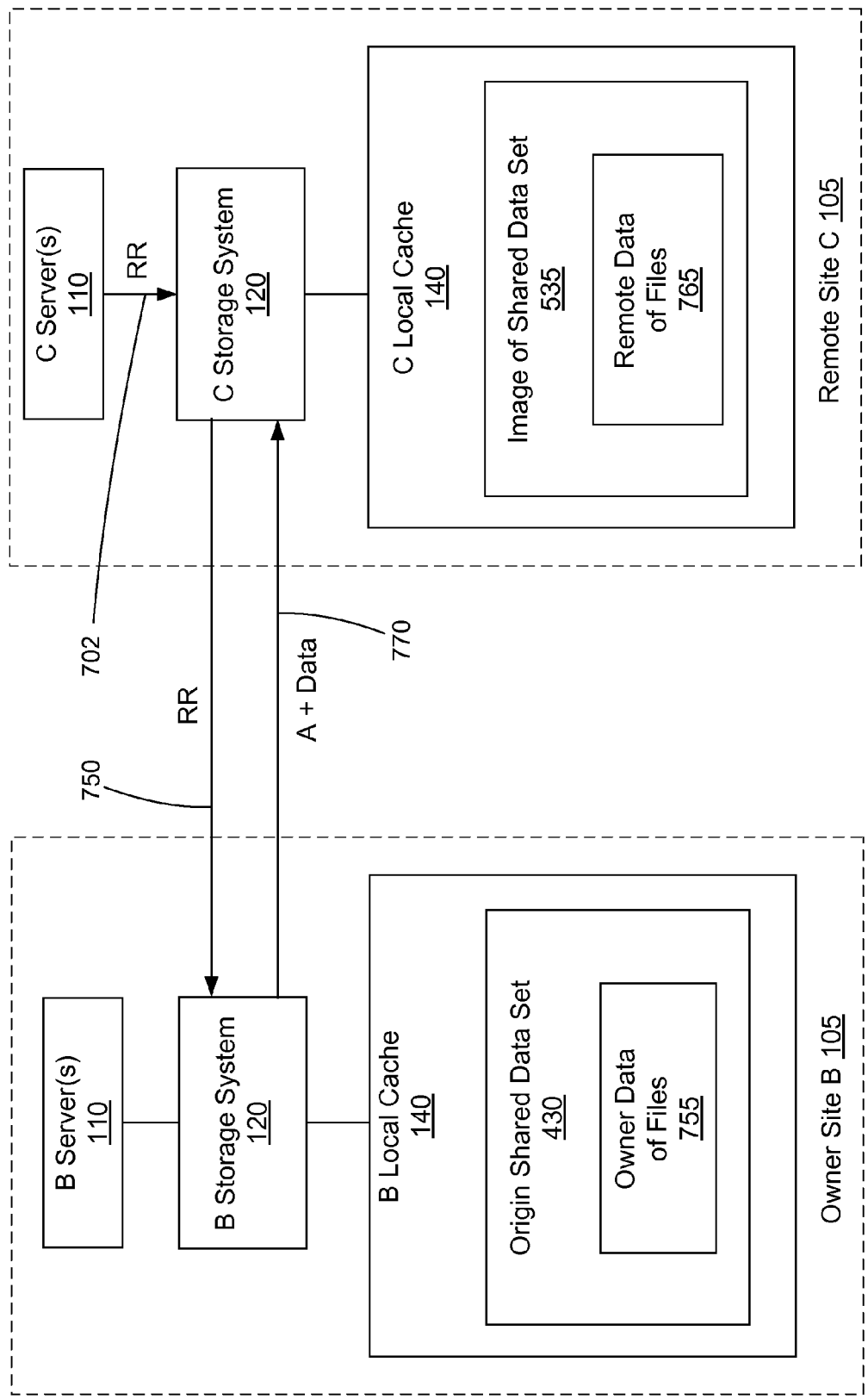

FIGS. 7A-B are conceptual diagrams of the operations of a caching method that may be implemented in conjunction with the synchronizing method in a shared data set environment 400. The caching method is performed by caching modules 355 residing and executing on the owner and remote storage systems 120 that may operate in conjunction to perform the caching method. The caching module 355 residing and executing on the owner storage system and owner site (e.g., site B) is referred to herein as the owner caching module, whereas the caching module 355 residing and executing on a remote storage system and remote site (e.g., site C) is referred to herein as a remote caching module. When performing the caching method, the caching modules 355 may generate, use, or store data (e.g., as stored in a cache file 370 in memory 324). In some embodiments, the cache file 370 comprises delegation information for particular files of the shared data set.

As shown in FIG. 7A, a remote storage system 120 at a remote site (e.g., site C) may receive a read request 702 (indicated as RR) from a server 110 (e.g., from an application 230 executing on the server 110) for particular data at a specified block range (e.g., block range X) of a specified file (e.g., file M) in the shared data set. Although the synchronizing method 600 has previously stored an image of the shared data set 535 to the local cache 140 of the remote site, the requested data (e.g., in block range X in file M) in the local cache 140 of the remote site may or may not contain be current, as a write operation to the specified file (e.g., file M) may have since occurred at the owner site.

In some embodiments, when receiving a read request 702 for a specified block range (e.g., block range X) of a specified file (e.g., file M), the remote storage system determines whether it retains a delegation indicator for the specified file, for example, by checking records (e.g., in the cache file 370) of delegation indicators received for particular files. If the remote storage system does not retain a delegation indicator for the specified file, this indicates that the remote storage system does not have the current owner attributes of specified file in the origin shared data set 430 stored at the owner site. As such, the remote storage system sends an attribute request for the specified file to the owner storage system (as discussed below in relation to FIG. 7A).

FIG. 7A shows a conceptual diagram of the operations of an attribute request sent from a remote site to the owner site. In some embodiments, to determine whether the requested data in the local cache 140 of the remote site is current (and thus can be retrieved directly from the local cache 140), the remote storage system 120 sends an attribute request 705 (indicated as AR) to the owner storage system 120 at the owner site (e.g., site B). The attribute request 705 (AR) requests the attributes of the file (e.g., file M) specified in the read request 702 (RR). The attribute request may also include a delegation request (indicated as DR) for the specified file. As discussed above, the owner storage system stores the data of the files 755 (owner data) and the attributes of the files 710 (owner attributes) of the origin shared data set 430. When receiving the attribute request, the owner storage system 120 retrieves the owner attributes of the specified file (e.g., file M) from the origin shared data set 430 stored in its local cache 140.

The owner storage system then sends the owner attributes and a delegation indicator for the specified file 715 (indicated as A+D) without sending any data of the specified file. In some embodiments, the attributes of a file include when the file was last modified. The owner storage system keeps a record of the delegation indicator given for the specified file to the particular remote storage system (e.g., stored to the cache file 370). The remote storage system then receives only the owner attributes and delegation indicator for the specified file 715 and no data of the specified file. The remote storage system keeps a record of the delegation indicator received for the specified file (e.g., stored to the cache file 370). As such, as experienced by the remote storage system, the latency/delay of the attribute request will be significantly less than the latency/delay of a read request sent to the owner site since the byte size of the attributes of a file being returned for an attribute request are typically much less than the byte size of the data of a file being returned for a read request.

As discussed above, the remote storage system stores the data of the files 765 (remote data) and the attributes of the files 720 (remote attributes) of the shared data set 535. When receiving the owner attributes of the specified file, the remote storage system then retrieves the remote attributes of the specified file (e.g., file M) from the shared data set 535 stored in its local cache 140. The remote storage system then compares the owner and remote attributes of the specified file (e.g., file M) to determine whether they match or not.

If the attributes match, this indicates that the remote attributes for the specified file is current with the owner attributes for the specified file. Since file attributes typically indicate when a file was last modified, if the remote attributes match the owner attributes, this also indicates that all data in the specified file of the image of the shared data set 535 stored at the remote storage system in its local cache 140 is current as well. As such, the requested data at the specified block range (e.g., block range X) in the specified file (e.g., file M) may be retrieved by the remote storage system from its local cache 140 (cache hit) and sent to the application 230 and server 110 that requested the data (via the initial read request 702).

If the attributes do not match, this indicates that the remote attributes for the specified file is not current with the owner attributes for the specified file and that one or more blocks of the specified file in the origin shared data set 430 have been modified at the owner site. Note that attributes typically describe the entire file and not the individual blocks of a file. As such, if the remote attributes do not match the owner attributes, it may be assumed that all of the data in the specified file stored at the remote storage system in its local cache 140 is not current as well. As such, the requested data is not retrieved by the remote storage system from its local cache 140 and is retrieved from the owner site (cache miss). To do so, the remote storage system sends a read request to the owner storage system for the requested data (as discussed in relation to FIG. 7B).

If the attributes match, the remote storage system also associates/attaches information to the delegation indicator for the specified file that indicates that the owner and remote attributes match for the specified file. For example, the record for the delegation for the specified file stored in the cache file 370 may contain a "matching" indicator. A delegation having an associated matching indicator is referred to herein as "matching" delegation. If the attributes do not match, the remote storage system associates/attaches information to the delegation indicator for the specified file that indicates that the owner and remote attributes do not match for the specified file. For example, the delegation record for the specified file stored in the cache file 370 may contain a "non-matching" indicator. A delegation having an associated non-matching indicator is referred to herein as "non-matching" delegation. The remote storage system may later use the matching or non-matching indicator associated with a delegation for a particular file to avoid the need for sending an attribute request to the owner site to retrieve owner attributes of the particular file and comparing the remote and owner attributes (since it already may determine from the matching or non-matching indicator whether the owner and remote attributes of the particular file match).

FIG. 7B shows a conceptual diagram of the operations of a read request sent from the remote site to the owner site. As shown in FIG. 7B, the remote storage system 120 may send, to the owner site, a read request 750 (indicated as RR) for data at the specified block range (e.g., block range X) of the specified file (e.g., file M). The owner storage system then retrieves the data of the specified blocks of the specified file from the origin shared data set 430 stored in its local cache 140 and sends the requested data 770 to the remote site. Note that in response to a read request, the attributes of the specified file will also be returned along with the data (indicated as A+data). The remote storage system receives the data and sends the data to the application 230 and server 110 that requested the data (via the initial read request 702).

As discussed above, when receiving a read request 702 for a specified block range (e.g., block range X) of a specified file (e.g., file M), the remote storage system determines whether it retains a delegation indicator for the specified file. If so, the remote storage system does not need to send an attribute request to the owner site to retrieve owner attributes of the specified file. Rather, the remote storage system determines whether the delegation for the specified file is a "matching" delegation. If so, this indicates that the remote attributes for the specified file is current with the owner attributes for the specified file and that all data in the specified file stored at the remote storage system is current as well. As such, the requested data at the specified block range (e.g., block range X) in the specified file (e.g., file M) may be retrieved by the remote storage system from its local cache 140 (cache hit) and sent to the application 230 and server 110 that requested the data (via the initial read request 702).

If the delegation for the specified file is not a matching delegation (i.e., is a non-matching delegation), this indicates that the remote attributes for the specified file is not current with the owner attributes for the specified file and that it may be assumed that all of the data in the specified file stored at the remote storage system in its local cache 140 is not current. As such, the requested data is retrieved from the owner site by the remote storage system by sending a read request to the owner storage system for the requested data (as discussed in relation to FIG. 7B).

Figure 8A:
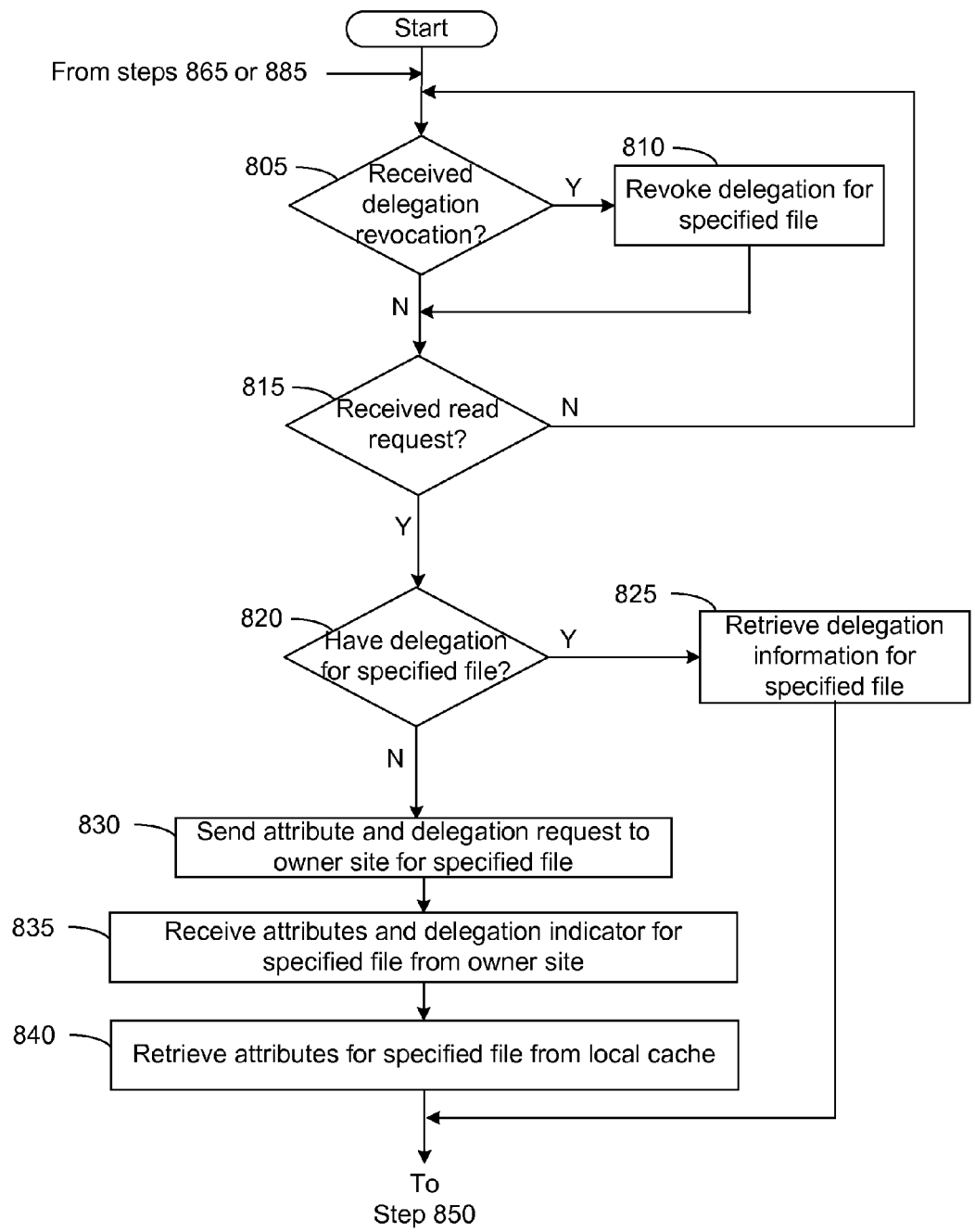
FIGS. 8A-B are flowcharts of a caching method used by a remote site in conjunction with the synchronizing method.
Figure 8B:
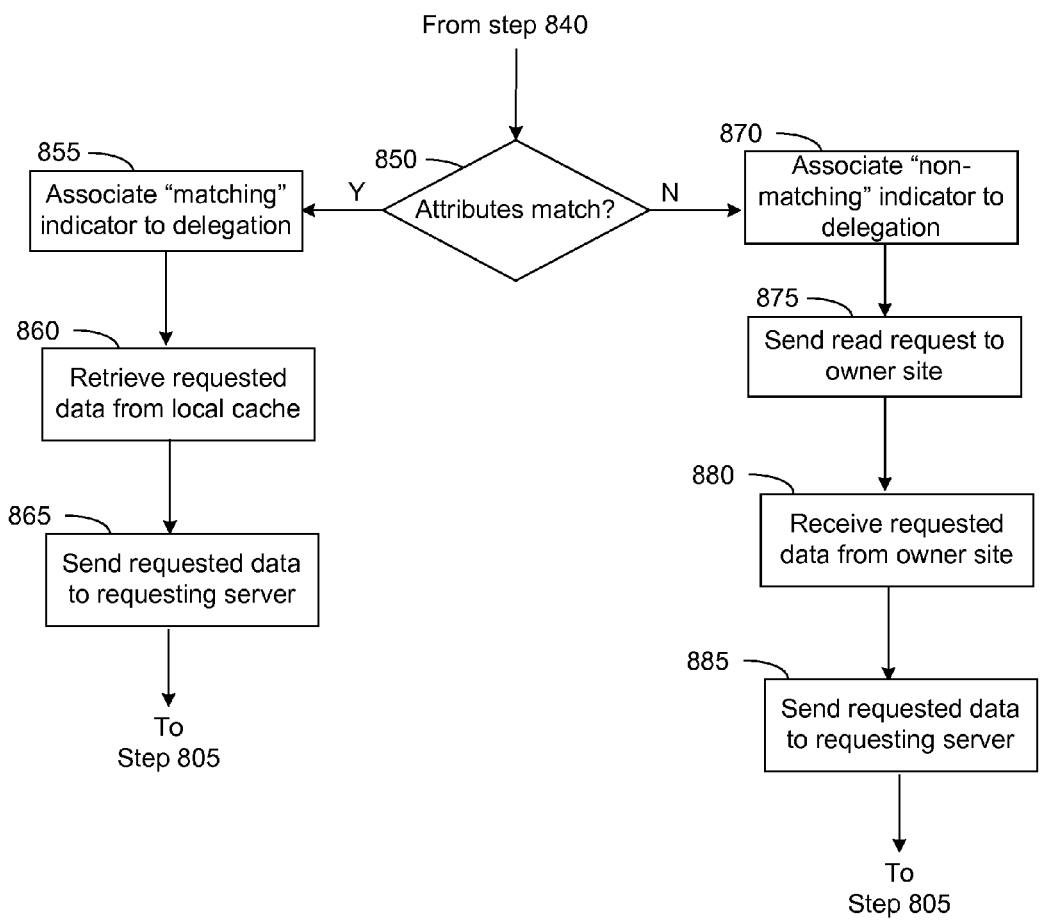

FIGS. 8A-B are flowcharts of a caching method 800 used by a remote site in conjunction with the synchronizing method 600 (of FIG. 6) to reduce its overall read latency in a shared data set environment 400. In some embodiments, the method 800 is implemented by software or hardware. In some embodiments, the steps of method 800 are performed by various software components executing on the storage system 120 of the remote site 105. For example, in some embodiments, the steps of method 800 may be performed by a remote operating system and remote caching module 355 residing and executing on the remote storage system. The order and number of steps of the method 800 are for illustrative purposes only and, in other embodiments, a different order and/or or number of steps are used.

The method 800 begins by determining (805) whether a delegation revocation for a particular file has been received from the owner site (e.g., in the form of a message from the owner site indicating that a delegation indicator for the particular file is no longer valid). If so, the method revokes (at 810) the delegation for the particular file (e.g., by modifying the delegation information in the cache file 370 for the particular file). If not, the method then determines (at 815) whether a read request (for a specified block range and file) has been received (e.g., from an application executing on a server 110). If not, the method continues at step 805.

If a read request has been received (at 815-Yes), the method determines (at 820) whether the remote site retains a delegation indicator for the specified file of the read request (e.g., by checking delegation information in the cache file 370). If so, the method retrieves (at 825) the delegation information for the specified file (and continues at step 850 discussed below). If not, the method sends (at 830) an attribute and delegation request to the owner site for the specified file. The method receives (at 835) the owner attributes and a delegation indicator for the specified file from the owner site (and does not receive any data of the specified file). In some embodiments, the attributes of a file include when the file was last modified. The method then retrieves (at 840) the remote attribute for the specified file from its local cache 140.

At step 850, the method determines whether the owner and remote attributes for the specified file match. The method may do so by comparing the owner and remote attributes or by checking the delegation information for the specified file which may include a "matching" or "non-matching" indicator. If the attributes match (at 850-Yes), if not already done so, the method 800 then associates (at 855) a "matching" indicator with the delegation for the specified file. As such, the method stores information (e.g., in the cache file 370) indicating that the owner and remote attributes of the specified file match. If the attributes match, this indicates a cache hit and the method retrieves (at 860) the requested data (at the block range and file specified by the read request) from its local cache 140. The method then continues at step 805.

If the owner and remotes attributes do not match (at 850—No), if not already done so, the method 800 then associates (at 870) a "non-matching" indicator with the delegation for the specified file. As such, the method stores information (e.g., in the cache file 370) indicating that the owner and remote attributes of the specified file do not match. If the attributes do not match, this indicates a cache miss and the method sends (at 875) a read request for the requested data (at the specified block range and file) to the owner site. The method receives (at 880) the requested data from the owner site and sends (at 885) the request data to the requesting server 110. The method then continues at step 805.

Figure 9:
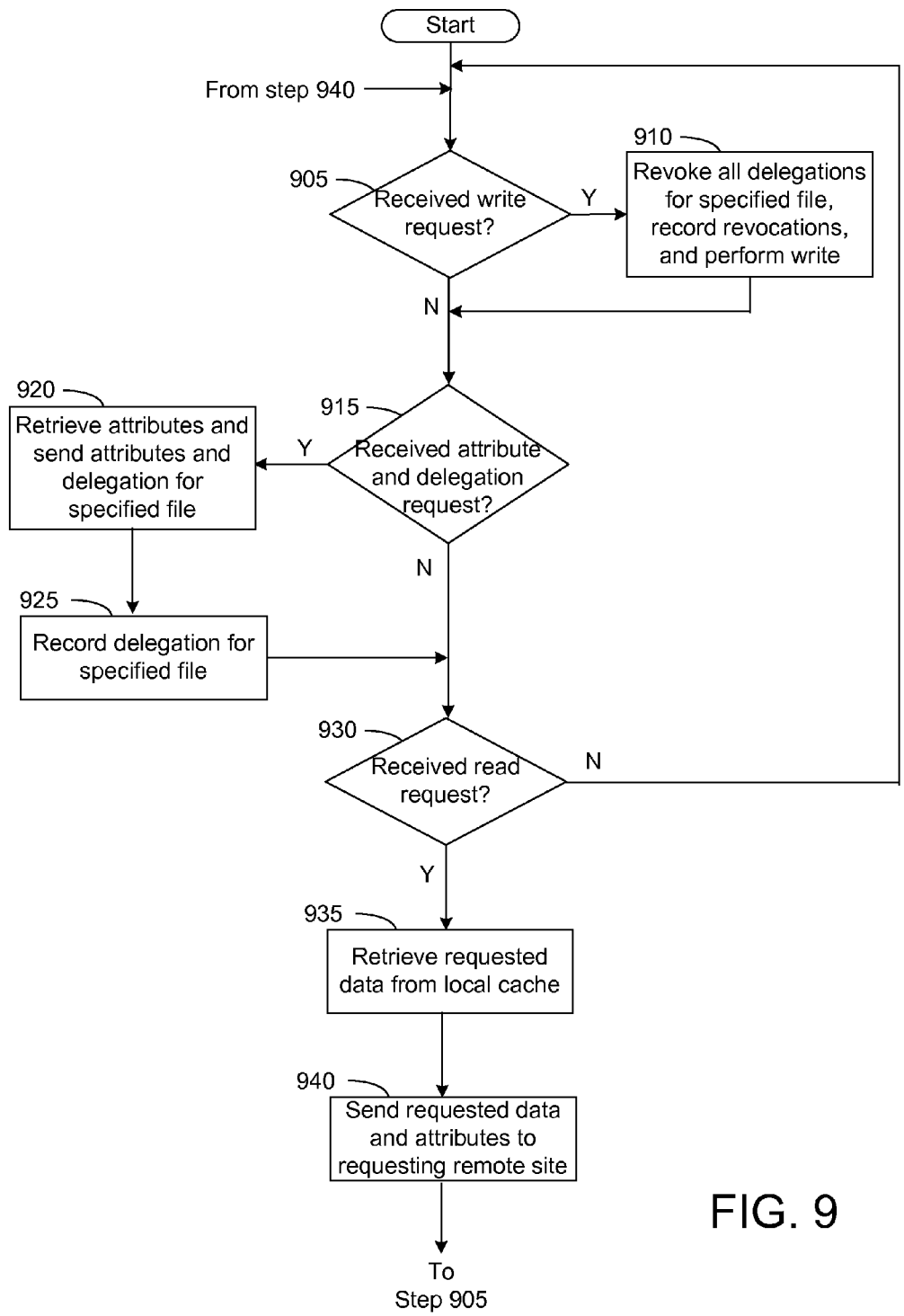
FIG. 9 is a flowchart of a caching method used by an owner site in conjunction with the synchronizing method.

FIG. 9 is a flowchart of a caching method 900 used by an owner site in conjunction with the synchronizing method 600 (of FIG. 6) to reduce overall read latency in remote sites of a shared data set environment 400. In some embodiments, the method 900 is implemented by software or hardware. In some embodiments, the steps of method 900 are performed by various software components executing on the storage system 120 of the owner site. For example, in some embodiments, the steps of method 900 may be performed by an owner operating system and owner caching module 355 residing and executing on the owner storage system (that stores the origin shared data set 430). The order and number of steps of the method 900 are for illustrative purposes only and, in other embodiments, a different order and/or number of steps are used.

The method 900 begins by determining (905) whether a write request (specifying a block range and file to be written to and the data to be written) has been received. If not, the method continues at step 915. If so, the method revokes (at 910) all delegations to remote sites for the specified file (e.g., by sending messages to all remote sites having a delegation for the specified file that the delegation is no longer valid) and records the revocations of the delegations for the specified file (e.g., by modifying the delegation information for the specified file in the cache file 370). The method then performs (at 910) the write request on the specified file stored in the origin shared data set 430. Note that the file system 332 of the owner storage system would then modify attributes of the specified file to reflect the changes to the file (such as when the specified file was last modified).

At step 915, the method determines whether an attribute and delegation request for a specified file has been received. If not, the method continues at step 930. If so, the method retrieves (at 920) the owner attributes for the specified file from the origin shared data set 430 stored to its local cache and sends the owner attributes and a delegation indicator for the specified file to the requesting remote site. The method records (at 925) the delegation given for the specified file to the requesting remote site (e.g., in a cache file 370).

At step 930, the method determines whether a read request for a specified block range and file has been received. If not, the method continues at step 905. If so, the method retrieves (at 935) the requested data from the origin shared data set 430 stored to its local cache and sends (at 940) the requested data and owner attributes of the specified file to the requesting remote site. The method then continues at step 905.

As described in Section III, the synchronizing method works in conjunction with the caching method to reduce overall read latency experienced by remote sites in the shared data set environment 400. The synchronizing method periodically "pushes" images of the origin shared data set stored at the owner site to the remote sites to keep data at the remote sites close to the origin shared data set. As such, in some situations under the caching method, a remote site may only need to request attributes of a file specified in a read request from the owner site rather than the actual requested data of the file. As the attributes of a file are typically much smaller in byte size than the actual requested data of the file, the latency period in retrieving the attributes of a file will typically be much shorter than when retrieving the requested data. As such, the overall read latency experienced by remote sites in the shared data set environment 400 may be reduced.

IV. Migration of Owner of Shared Data Set

As discussed above, an entity may maintain and operate a set of storage system sites distributed through different geographic regions, where the owner site storing the origin shared data set is the only site that may directly perform write operations on the shared data set (whereas the remote sites must write to the shared data set by proxy through the owner site). For example, an entity may have storage system sites in India and the U.S.A. that access a shared data set that is stored at the India site (the owner site). Thus a remote site in the U.S.A., for example, will typically experience significant latency when sending reading or writing to the shared data set stored at the owner site in India.

Note, however, that storage system sites may be located in different time zones, and thus are typically "active" (i.e., receive a substantial number of access requests) at different times. A site is typically most active during the business hours of the time zone it is located and not active outside of its business hours. For example, if the site in India is active and operating during its business hours, the site in the U.S.A. is typically not active since it is outside the business hours in the U.S.A. (given the time difference between the two countries), and vice versa. As such, it may be advantageous to move ownership of the origin shared data set to the site that is most active to reduce the overall read/write latency in the set of distributed sites. For example, it may be advantageous to have the India site have ownership of the origin shared data set during its business hours, and after its business hours, change ownership of the origin shared data set to the U.S.A. site during its business hours, and after its business hours change ownership back to the India site, and so forth in a periodic cycle.

By moving the origin shared data set to the site that is currently receiving the highest number of read/write requests, the overall read/write latency in the set of distributed sites may be reduced as most of the read/write requests can then be performed locally at the owner site. However, it is not desirable to completely shut-down access to the shared data at each site and taking the shared data set off-line while ownership is transferred. Such a shut-down of access may entail temporarily stopping the receiving/accepting of access requests from clients accessing the shared data set (such as a user or an application 230 executing on the server system 110) and sending error messages to the clients that the shared data set is temporarily unavailable for access.

In some embodiments, a migration method is used to change the owner of the origin shared data set from a current owner site to a new owner site. In these embodiments, access requests from client are continued to be received and processed during the change of ownership of the shared data set. As such, the migration method provides to the clients a seamless and invisible transfer of ownership of the shared data set that does not require modification of the clients' operations or submittal of access requests.

During the change of ownership of the origin shared data set, the migration method will synchronize data of the shared data set at the current and new owner sites so that the new owner site contains all the data of the shared data set stored at the current owner site at the time the change of ownership begins. As such, in some embodiments, the synchronizing method (discussed in Section III) may be used prior to changing ownership of the shared data set using the migration method. The synchronizing method may be used to periodically transmit images of the origin shared data set stored at the owner site to the remote sites to keep data at the remote sites close to the origin shared data set. If the synchronizing method is used, the difference in the data of the shared data set stored at the current owner site and a new owner site (which is currently a remote site) will be the changes to the origin shared data set stored at the current owner site since the last image was generated and transmitted to the new owner site. In these embodiments, upon initiation of the migration method when change of ownership begins, a delta image capturing this difference in the data is generated and transmitted from the current owner site to the new owner site.

In other embodiments, the synchronizing method is not used prior to changing ownership of the shared data set using the migration method. The migration method may be implemented completely independent from and without assistance of the synchronizing or caching methods described in Section III. In these embodiments, upon initiation of the migration method when change of ownership begins, a base image capturing the origin shared data set stored at the current owner site may be generated and transmitted to the new owner site. Note that the base image will typically be larger in byte size than a delta image that may be generated and transmitted if the synchronizing method is used. As such, use of the synchronizing method prior to use of the migration method may reduce the amount of time needed to perform the migration method since the larger-sized base image will take longer to transmit and store to the new owner site. However, as discussed above, the migration method may also be implemented completely independent from and without assistance of the synchronizing or caching methods.

FIGS. 10A-F are conceptual diagrams of the operations of the migration method that may be implemented in a shared data set environment 400 of FIG. 4. The migration method may be performed by migration modules 360 and storage operating systems 330 residing and executing on each storage system 120 that operate in conjunction to change ownership from a current owner site (e.g., site B) to a new owner site (e.g., site C). As used herein, a "current owner" migration module 360 and storage operating system 330 reside and execute on a current owner storage system and site (e.g., site B) that is the current owner of the origin shared data set, a "new owner" migration module 360 and storage operating system 330 reside and execute on a remote storage system and site (e.g., site C) that will be the new owner of the origin shared data set, and a "remote" migration module 360 and storage operating system 330 reside and execute on a remote storage system and site (e.g., site A of FIG. 4) that will not be the new owner of the origin shared data set. When performing the migration method, the migration modules 360 or the storage operating systems 330 may generate, use, or store data in a migration file 375 stored to memory 324. As discussed below, such data may include change logs of interim writes and/or records of suspended read/write requests.

In some embodiments, an application 230 or the current owner migration module 360 at the current owner site may be configured to initiate and perform the migration method at predetermined time intervals automatically without human initiation or intervention. For example, a site located in India may be configured to automatically initiate the migration method every day after business hours to change ownership to a site in the U.S.A., whereby the U.S.A. site is similarly configured to automatically initiate the migration method every day after business hours to change ownership to the India site. As such, each site may own the origin shared data set during its respective business hours and thereby experience reduced latency when accessing the origin shared data set during business hours. In other embodiments, the migration method may be manually initiated by an administrator (e.g., through a user interface of the storage operating system 330). After initiation, the migration method may then be performed automatically by the migration modules 360 on each storage system 120 that operate in conjunction to change ownership from the current owner site to the new owner site.

Figure 10A:
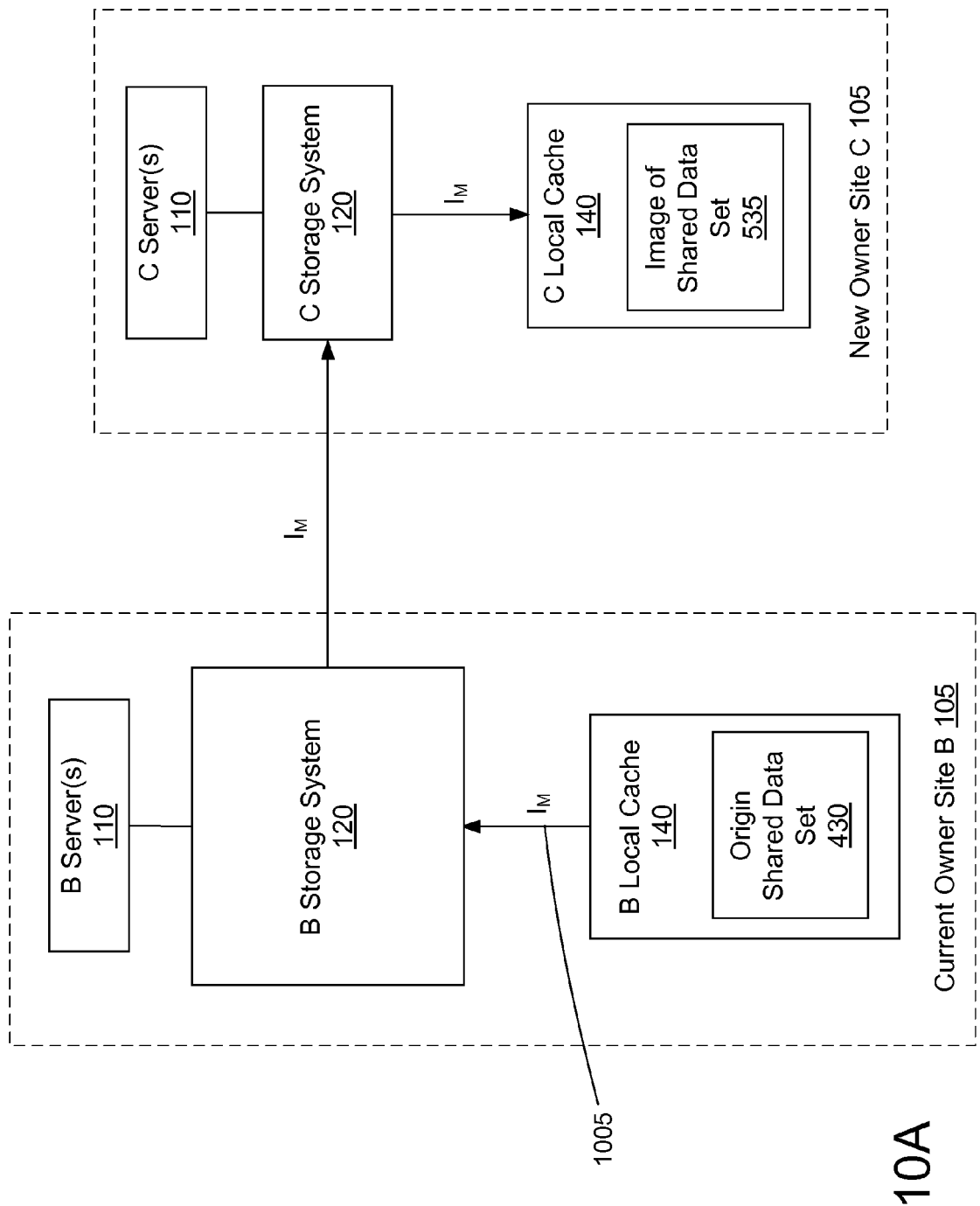
FIGS. 10A-F are conceptual diagrams of the operations of the migration method that may be implemented in a shared data set environment of FIG. 4.

FIG. 10A shows the start of the migration method (after automatic or manual initiation) whereby the current owner migration module 360 on the current owner storage system and site (e.g., site B) generates an image ($I_M$) 1005 of the origin shared data set 430 (stored in the local cache 140 of the current owner site). The image ($I_M$) 1005 may comprise a base image capturing all data of the origin shared data set 430 or a delta image capturing any changes to the origin shared data set 430 that occurred since a just previous image of the origin shared data set 430 was generated. The image ($I_M$) may comprise a delta image, for example, if the synchronizing method (discussed in Section III) is used prior to the initiation of the migration method. The image ($I_M$) then begins being transmitted to the new owner storage system and site (e.g., site C).

As referred to herein, "t0" represents the approximate point in time or time period that the current owner migration module 360 generates the image ($I_M$) and begins transmitting the image ($I_M$) 1005 to the new owner site. As such, write requests to the origin shared data set 430 after time t0 will not be reflected in the image ($I_M$) 1005. As referred to herein, "t1" represents the approximate point in time or time period that transmission of the image ($I_M$) 1005 to the new owner site completes and the image ($I_M$) 1005 has been stored to the local cache 140 of the new owner site. Write requests to the origin shared data set 430 received by the current owner site between time t0 and time t1 are referred to as "interim" write requests. Per usual, interim write requests may originate from any of the sites that share the shared data set, including the current owner site, new owner site, or any of the other remote sites. For example, the interim write requests may originate from applications 230 executing on current owner site, new owner site, or any of the other remote sites.

Figure 10B:
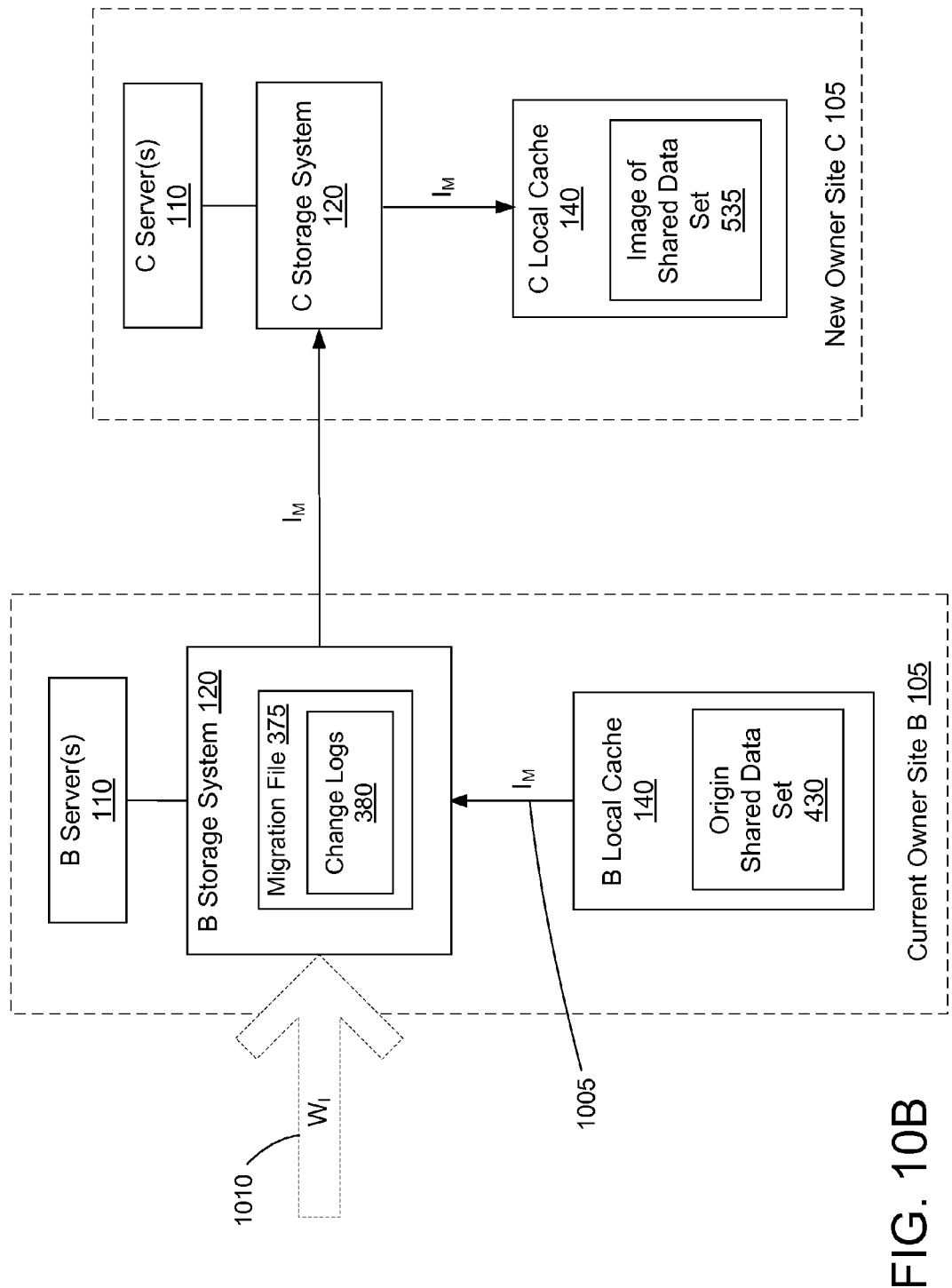
Figure 10C:
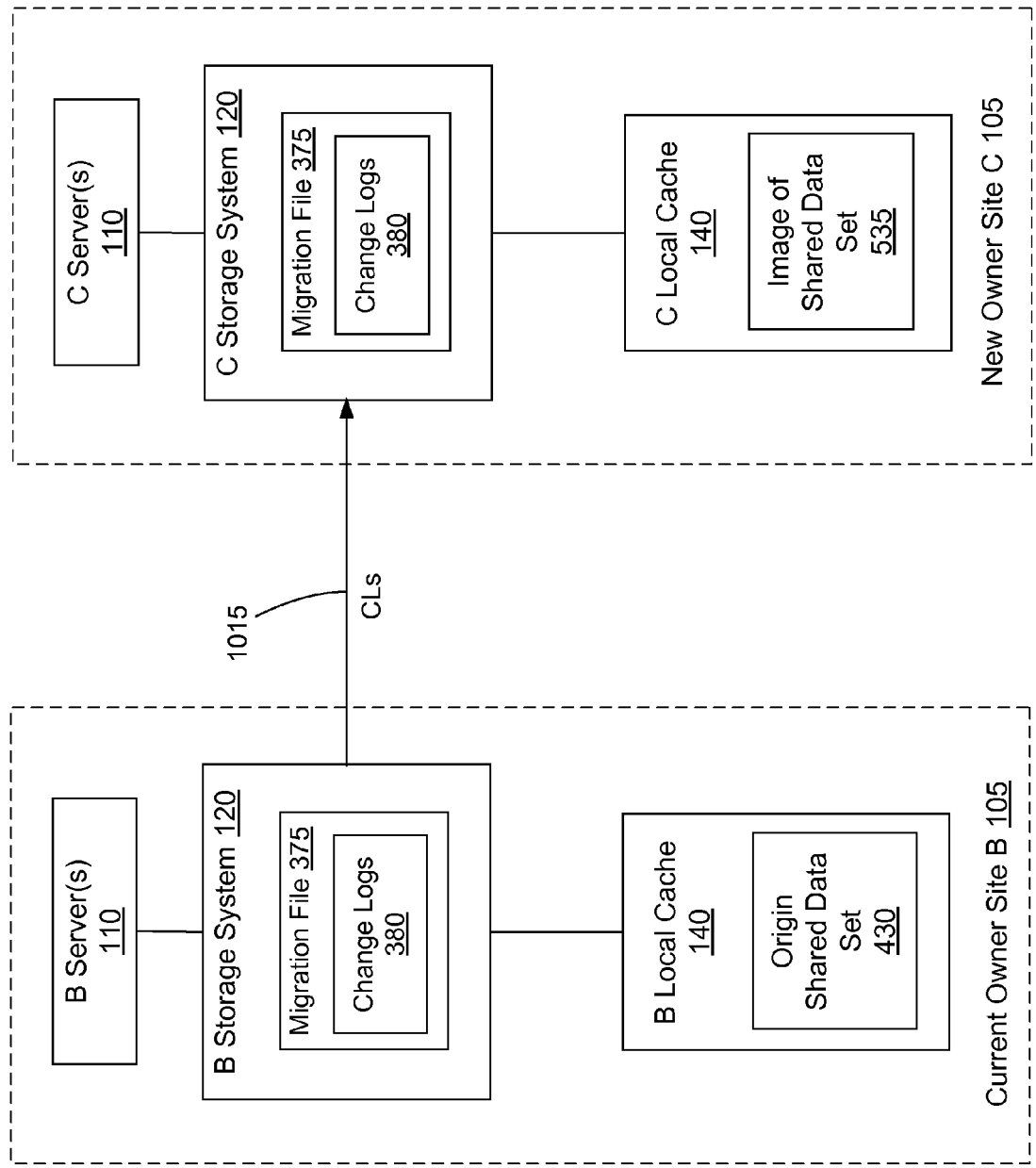
Figure 10D:
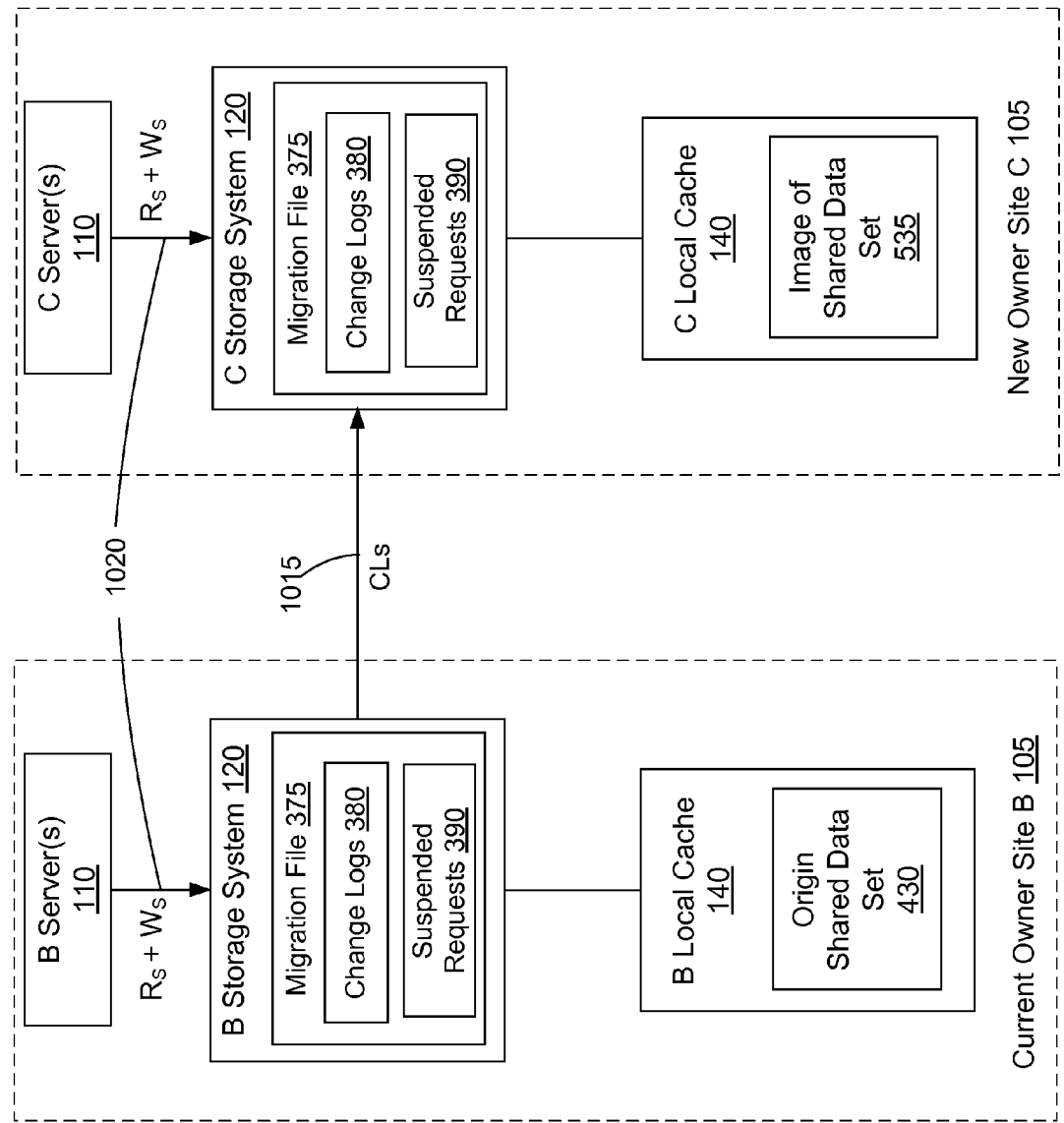

The interim write requests from all of the sites is conceptually shown in FIG. 10B as $W_I$ 1010. The interim write requests ($W_I$) 1010 are received by the current owner site (site B) while the image ($I_M$) 1005 is being transmitted and stored to the new owner site (site C). For each interim write request received by the current owner storage system, the current owner storage operating system 330 performs the interim write request on the origin shared data set 430 as per usual. In addition, a change log 380 for each received interim write request is generated that describes a change to the origin shared data set 430 that was caused by performance of the interim write request on the origin shared data set 430. The generated change logs 380 may be stored, for example, in the migration file 375 stored in memory 324. The current owner migration module 360 or the current owner storage operating system 330 may be configured to generate the change logs.

As known in the art, a change log of a write request describes a change in data caused by performing the write request. In some embodiments, the change log of a write request comprises a pointer to changed data in the origin shared data set 430 (stored at the current owner site) caused by the write request, but does not contain the actual changed data itself. For example, the pointer may comprise a file system identifier (fsid), file identifier, and a file block range. As known in the art, a storage system 120 may implement a plurality of file systems, whereby the storage operating system 330 associates each implemented file system with a unique file system identifier to distinguish between the different file systems. The file identifier may uniquely identify a particular file within a particular file system and the file block range may identify data of a particular block range within the particular file that has been changed by the write request. In other embodiments, the change log comprises other information that is used to identify changed data in the origin shared data set 430.

As such, between time t0 and time t1, interim write requests are received and performed by the current owner site and a set of change logs 380 are generated based on the interim write requests. The set of change logs 380 describe/reflect the totality of changes made to the origin shared data set 430 between time t0 and time t1 due to performing the interim write requests. Note that since the image ($I_M$) 1005 of the origin shared data set 430 was generated and transmitted at time t0, the image ($I_M$) 1005 does not capture any of the changes described in the change logs 380. Also between time t0 and time t1, each storage system 120 also receives interim read requests. In some embodiments, each interim read request received by a storage system 120 is performed by the storage system as per usual (e.g., using a caching method or not using a caching method).

The new owner migration module 360 residing at the new owner storage system 120 may be configured to receive transmission of the image ($I_M$) from the current owner site and store the image ($I_M$) to its local cache 140 (as an image of shared data set 535). In some embodiments, upon the transmission and storing of the image ($I_M$) finishing at time t1, the new owner site may perform one or more of the following operations: 1) send a message to the current owner site that transmission of the image ($I_M$) is complete; 2) send a message to all sites (except the current owner site) that it is the new owner of the origin shared data set 430; 3) send a message to all sites (except the current owner site) that all delegation indicators held by the site are revoked; and 4) send a message to all sites to block/suspend all read/write requests. In some embodiments, the new owner migration module 360 is configured to send the one or more messages to migration modules 360 residing at the other sites. In some embodiments, one or more messages to be sent to the same site may be combined into a single message.

The new owner site may send a message to the current owner site that transmission of the image ($I_M$) is complete as a return response to the current owner site initiating the sending of the image ($I_M$) to the new owner site. In response to receiving the message, the current owner site may then stop performing received interim write requests and producing change logs for the interim write requests and begin transmitting the set of change logs 380 (represented as "CLs" 1015 in FIG. 10C) to the new owner site.

The new owner site sends a message to all sites indicating that all delegation indicators held by the site are revoked since the shared data set stored in each site's local cache 140 can not be considered current anymore. This is due to the fact that the interim write requests reflected in the change logs (CLs) 1015 have been transmitted to the new owner site (at time t1), but have not yet been integrated into the shared data set by the new owner site. In some embodiments, the new owner site also revokes all delegations held by itself. The new owner site does not need to send a message to the current owner site to revoke all delegations held by the current owner site since, as the owner of the origin shared data set 430, the current owner site will not hold any delegations. Upon receiving the message, each site may revoke all delegations for all files held by the site (e.g., by modifying the delegation information in the cache file 370 to indicate that all delegations have been revoked for all files).

In response to receiving the message to block/suspend all read/write requests, each site (including the current owner site, new owner site, and all other remote sites) begins to suspend received read/write requests by accepting the read/write requests but not performing the read/write requests. Rather, for each received read/write request, each site produces and stores a record of the read/write request. As referred to herein, "t1" also represents the approximate point in time or time period that the current owner site begins transmitting the set of change logs (CLs) 1015 to the new owner site. As referred to herein, "t2" represents the approximate point in time or time period that transmission of the set of change logs (CLs) 1015 to the new owner site completes and has finished being been stored to the new owner site (e.g., stored to a migration file 375 in memory 324). Read/write requests to the shared data set received by each site between time t1 and time t2 are referred to as "suspended" read/write requests. The suspended read/write requests may originate from applications 230 executing on a server system 110 of a site (represented as $R_S+W_S$ 1020 in FIG. 10D) and may be recorded in a storage system 120 of the site (represented as suspended requests 390 stored to the migration file 375 in FIG. 10D). As such, between time t1 and time t2, all sites (including the current owner and new owner sites) receive but do not perform suspended read/write requests and produce and store records of the suspended read/write requests 390.

In some embodiments, upon the transmission and storing of the change logs 380 to the new owner site finishing at time t2, the new owner site may perform one or more of the following operations: 1) send a message to all sites to unblock read/write requests; and 2) send a message to all sites that it can now accept write requests to the shared data set. In some embodiments, the new owner migration module 360 is configured to send the one or more messages to migration modules 360 residing at the other sites. In some embodiments, one or more messages to be sent to the same site may be combined into a single message.

In response to receiving the message to unblock read/write requests, each site may then stop suspending read/write requests and recording the suspended read/write requests. The new owner site also unblocks its read/write requests. Each site may then start performing their own suspended read requests using the stored records of the suspended read requests. In response to receiving the message that the new owner site can now accept write requests, each site may then send records of its suspended write requests (represented as $W_S$ 1025 in FIG. 10E) to the new owner site. Note that the suspended write requests may be sent from the current owner site (e.g., site B) as well as from other sites (not shown in FIG. 10E).

Read/write requests to the shared data set received by each site after time t2 are referred to as "new" read/write requests. The new read/write requests may originate from applications 230 executing on a server system 110 of a site (represented as $R_N+W_N$ 1030 in FIG. 10F). Each site may then start performing received new read requests and send received new write requests (represented as $W_N$ 1035 in FIG. 10F) to the new owner site for performing on the origin shared data set 535. Note that the new write requests may be sent from the current owner site (e.g., site B) as well as from other sites (not shown in FIG. 10F).

Figure 10E:
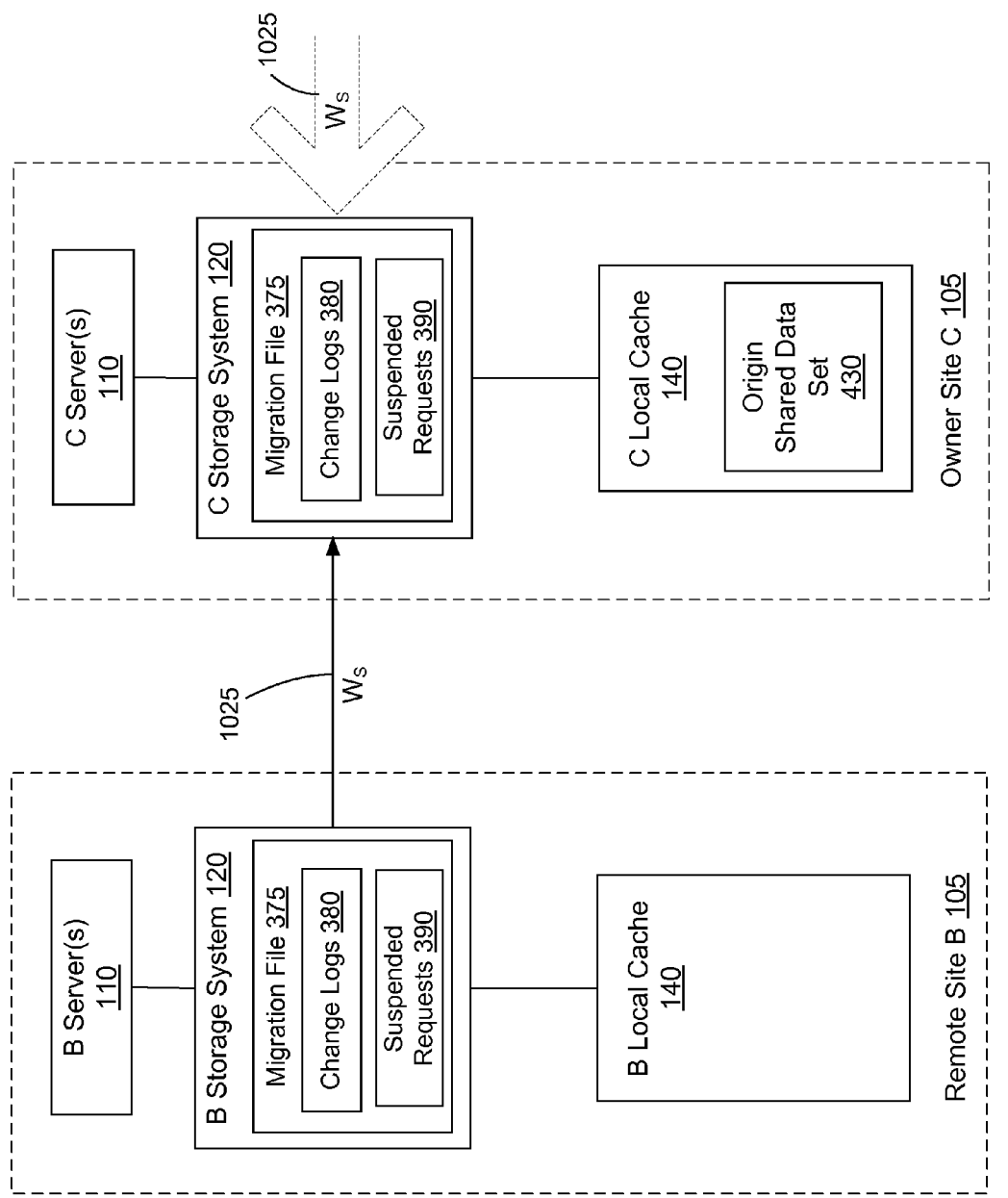
Figure 10F:
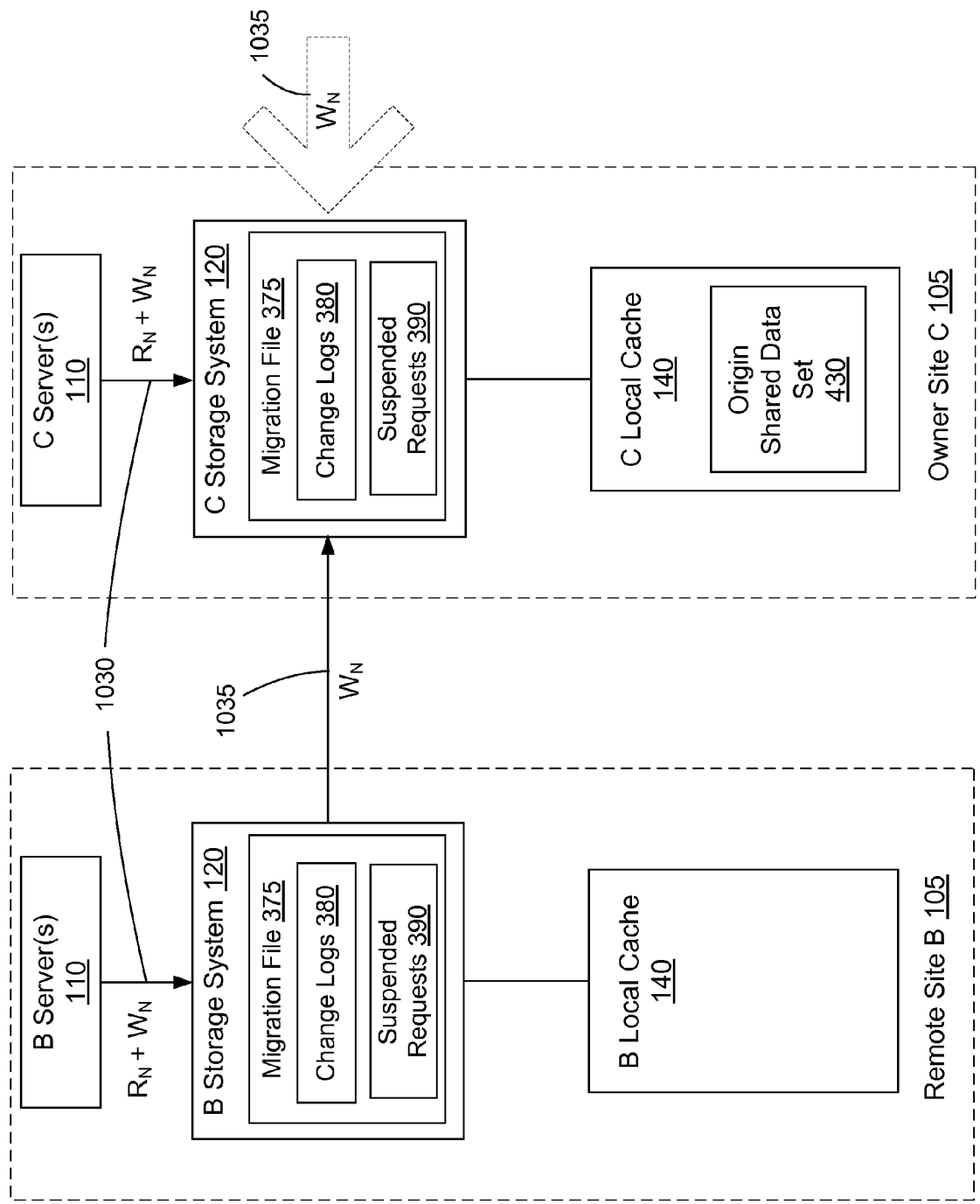

As such, from time t2, all sites send write requests for the shared data set to the new owner site that begins accepting the write requests for performing on the shared data set. Thus, from time t2, the new owner site is the actual owner of the origin shared data set 535 and the current owner site is a remote site. This change of ownership at time t2 is shown in FIG. 10E where current owner site B is now remote site B and new owner site C is now owner site C that stores the origin shared data set 535 in its local cache 140.

As described above, after time t2, the new owner site will have received or will be in the process of receiving three different types of write requests: 1) interim write requests (reflected in the set of change logs 380) that were received by the current owner site between time t0 and t1; 2) suspended write requests that were received by all the sites between time t1 and t2; and 3) new write requests that are continually being received by all the sites after time t2. In some embodiments, the new owner site performs each write request in chronological order. In some embodiments, the new owner site may first integrate the set of change logs 380 that reflect the interim write requests into the origin shared data set 430, then afterwards, perform the received suspended write requests, and then lastly perform the new write requests.

As discussed above, a change log of a write request describes a change in data of the origin shared data set 430 caused by the current owner site performing the write request on the origin shared data set 430 that was stored to the local cache 140 of the current owner site (before ownership changed to the new owner site at time t2). As such, the change log may comprise a pointer to the changed data in the origin shared data set 430 stored at the current owner site, but does not contain the actual changed data itself (which is stored at the local cache 140 of the current owner site). The new owner site may use the pointer in a change log to read/retrieve the actual changed data from the local cache of the current owner site and then write the retrieved data into the origin shared data set 430 stored to the local cache 140 of the new owner site at the location specified by the pointer in the change log. The above process is sometimes referred to as "integrating" a change log into the origin shared data set 430.

In some embodiments, the set of change logs 380 are integrated in chronological order whereby a change log representing an earlier-received interim write request is integrated into the origin shared data set 430 before a change log representing a later-received interim write request that was subsequently received by the current owner site. For example, if producing an individual change log file for each received interim write request, the current owner site may send (between time t1 to time t2) the individual change log files to the new owner site in chronological order (in the order they are produced) so that the new owner site receives and integrates the change logs in chronological order (so that the first-received interim write request is integrated first). As a further example, if producing a single file containing all change logs for the received interim write requests, the current owner site may record the change logs in chronological order so that the change log for the first-received interim write request is listed first in the file, and so on. When the new owner site receives the file, the new owner site may integrate the change logs in the order listed in the file (so that the first-received interim write request is integrated first).

In some embodiments, the suspended write requests may be performed in chronological order whereby an earlier-received suspended write request is performed on the origin shared data set 430 before a later-received suspended write request. In some embodiments, the time that a suspended write request is received may be based on the time a storage system 120 received the write request (e.g., from an application 230 executing on a server 110) and created a record of the write request. Likewise, the new write requests may be performed in chronological order whereby an earlier-received new write request is performed on the origin shared data set 430 before a later-received new write request. In some embodiments, the time that a new write request is received may be based on the time a storage system 120 receives the new request (e.g., from an application 230 executing on a server 110).

Figure 11:
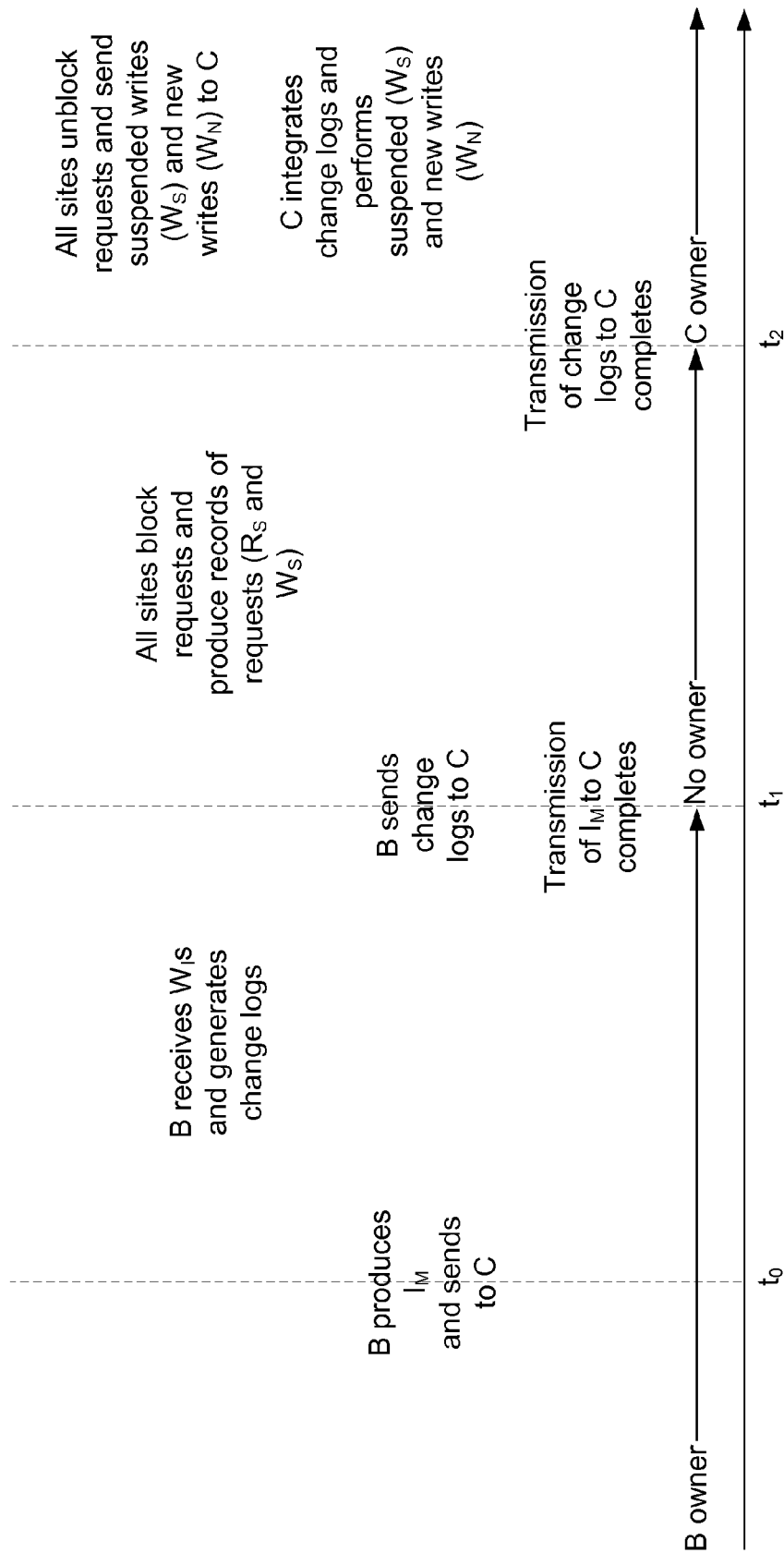
FIG. 11 shows a time-line of some of the operations and events of the migration method.

FIG. 11 shows a time-line of some of the operations and events of the migration method. FIG. 11 is described in relation to FIGS. 10A-F. In the example of FIGS. 10A-F and 11, ownership is being changed from current owner site B to new owner site C. Before time t0, current owner site B is the owner of the origin shared data set 430 as site B may receive and perform write requests directly on the origin shared data set 430 (whereas all other sites must send write requests to site B to be performed). At time t0, the migration method is started/initiated (automatically or manually) whereby current owner site B generates an image ($I_M$) 1005 of the origin shared data set 430 and begins transmitting the image ($I_M$) 1005 to new owner site C.

Between time t0 and time t1, current owner site B receives (from all sites including the current owner site, new owner site, or any of the other remote sites) interim write requests ($W_I$s). The current owner site B performs each received interim write request and generates a change log for each interim write request. At time t1, transmission of the image ($I_M$) 1005 to new owner site C has finished and the image ($I_M$) 1005 has been stored to the local cache 140 of new owner site C. New owner site C then sends a message to current owner site B that transmission of the image ($I_M$) is complete, whereby current owner site B responds by beginning to transmit the set of change logs produced for the interim write requests received between time t0 and t1.

At time t1, new owner site C also sends a message to all sites to block/suspend all read/write requests. From time t1 to time t2, each site suspends received read/write requests by accepting the read/write requests but not performing the read/write requests. Rather, for each received read/write request, each site produces and stores a record of the read/write request (referred to as suspended read/write requests). At time t2, transmission of the set of change logs (CLs) 1015 to new owner site C completes and has finished being been stored to new owner site C (e.g., stored to a migration file 375 in memory 324). At time t2, new owner site C sends a message to all sites to unblock read/write requests and that it can now accept write requests to the shared data set.

From time t2, each site stops suspending read/write requests and recording the suspended read/write requests, starts performing their own suspended read requests, and starts sending records of its suspended write requests ($W_s$) to new owner site C. From time t2, each site also starts accepting new read/write requests, performing their own new read requests, and sending new write requests ($W_N$) to new owner site C. Since, from time t2, all sites send write requests for the shared data set to new owner site C which begins accepting the write requests for performing on the shared data set, new owner site C is the actual owner of the origin shared data set 535 from time t2. From time t2, new owner site C starts to integrate the interim write requests (reflected in the set of change logs 380) into the origin shared data set 430, starts to perform suspended write requests, and starts to perform new write requests. In some embodiments, new owner site integrates or performs each write request in chronological order.

Note that from t0 to t2, ownership of the origin shared data set 430 is migrated from current owner site B to new owner site C. From before time t0 to time t1, current owner site B may be considered the actual owner of the origin shared data set 430 since current owner site B may perform write requests directly on the origin shared data set 430 (as interim write requests are performed on the origin shared data set 430 by current owner site B between time t0 and t1). From time t1 to time t2, neither the current owner site B or new owner site C are the actual owner of the origin shared data set 430 since neither sites may perform write requests directly on the origin shared data set 430 during this period. From time t2 onwards, new owner site C may be considered the actual owner of the origin shared data set 430 since it may perform write requests directly on the origin shared data set 430.

Figure 12:
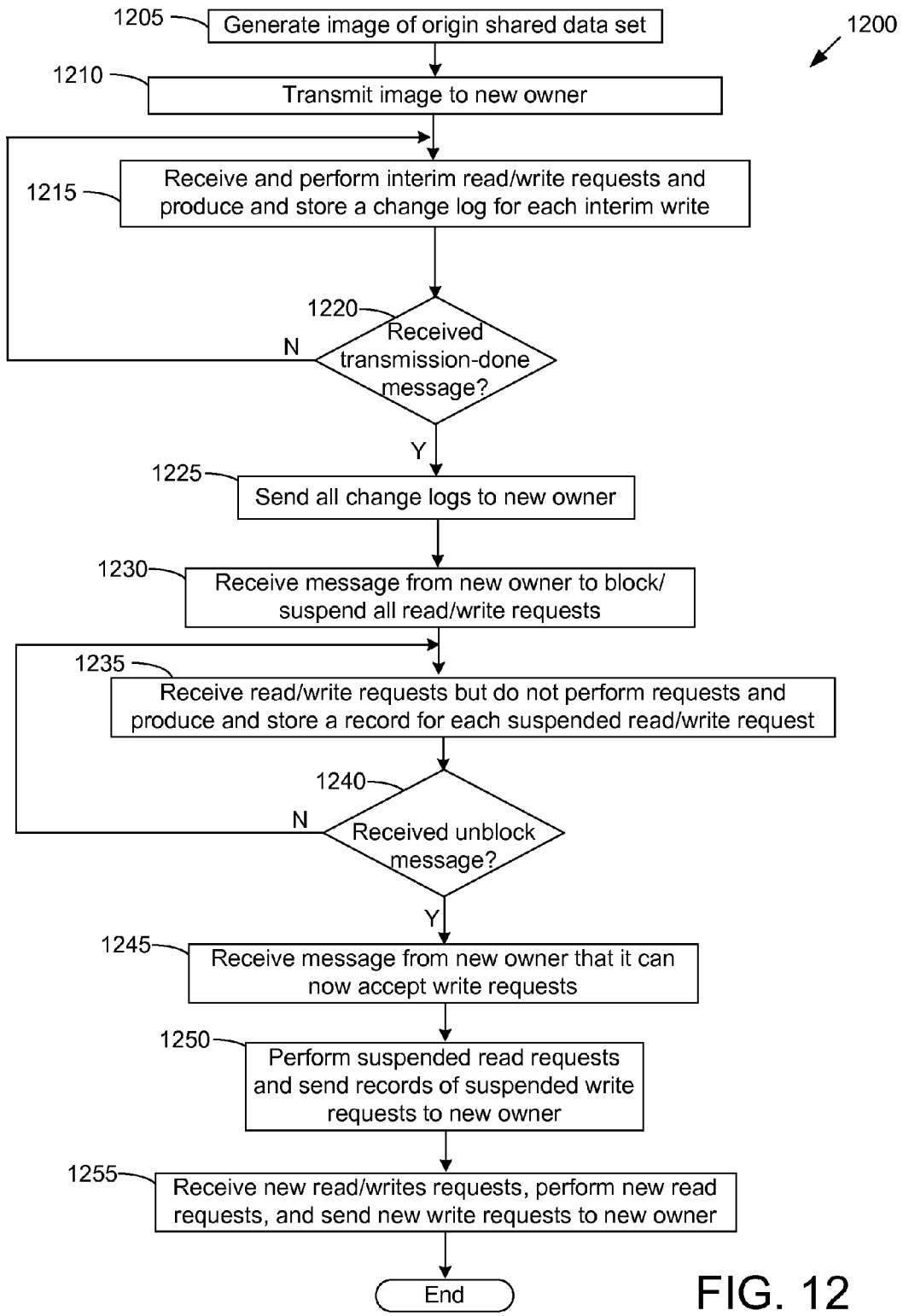
FIG. 12 is a flowchart of a current owner migration method for migrating ownership of the origin shared data set.

FIG. 12 is a flowchart of a current owner migration method 1200 for migrating ownership of the origin shared data set 430 from a current owner site to a new owner site in a shared data set environment 400. In some embodiments, the method 1200 is implemented by software or hardware. In some embodiments, the steps of method 1200 are performed by various software components that reside on the current owner site. For example, steps of the method 1200 may be performed by the current owner operating system 330 and current owner migration module 360 residing and executing on the current owner storage system 120 that stores the origin shared data set 430 in local cache 140. The various software components on the current owner site may work in conjunction with various software components (such as operating systems 330 and migration modules 360) that reside on the new owner site and other remote sites to migrate ownership of the origin shared data set 430 to the new owner site. The order and number of steps of the method 1200 are for illustrative purposes only and, in other embodiments, a different order and/or number of steps are used.

In some embodiments, the method 1200 may be configured to start/initiate automatically without human initiation or intervention at predetermined time intervals. In other embodiments, the migration method may be manually initiated (e.g., by an administrator). After initiation, the method 1200 begins by generating (at 1205) an image ($I_M$) 1005 of the origin shared data set 430 at time t0. The image ($I_M$) 1005 may comprise a base or delta image. The method then begins transmitting (at 1210) the image ($I_M$) to the new owner site. The method then begins receiving and performing (at 1215) interim write requests to the origin shared data set 430. The interim write requests may originate from any of the sites that share the shared data set, including the current owner site, new owner site, or any other remote site. For each received interim write request, the method 1200 also produces a change log 380 that describes a change to the origin shared data set 430 that was caused by performance of the interim write request on the origin shared data set 430. The generated change logs 380 may be stored, for example, in the migration file 375 stored in memory 324.

The method 1200 then determines (at 1220) whether a "transmission-complete" message has been received from the new owner site that the transmission of the image ($I_M$) 1005 to the new owner site has completed. If not, the method continues at step 1215 where it continues to receive interim write requests and produce change logs. If the transmission-complete message has been received (at 1220-Yes), the method stops performing received interim write requests and producing change logs and begins transmitting (at 1225) the set of change logs (CLs) 1015 to the new owner site at time t1. The method also receives (at 1230) a "block" message from the new owner site to block/suspend all read/write requests. Note that the transmission-complete and block messages may comprise a single message. In response, the method 1200 begins to suspend received read/write requests by receiving (at 1235) read/write requests but not performing the read/write requests. For each received read/write request, the method produces and stores (at 1235) a record of the suspended read/write request.

The method 1200 then determines (at 1240) whether an "unblock" message has been received from the new owner site to unblock received read/write requests. If not, the method continues at step 1235 where it continues to receive read/write requests and produce records of the suspended requests. If the unblock message has been received (at 1240-Yes), the method stops suspending read/write requests at time t2. The method also receives (at 1245) a "accepting-writes" message from the new owner site that it can now accept write requests to the shared data set. Note that the unblock and accepting-writes messages may comprise a single message. The method begins to perform (at 1250) its suspended read requests (using the stored records of the suspended read requests) and send records of its suspended write requests to the new owner site. The method also begins to receive (at 1255) new read/write requests to the shared data set, perform the new read requests, and send the new write requests ($W_N$) 1035 to the new owner site. The method 1200 then ends.

Figure 13:
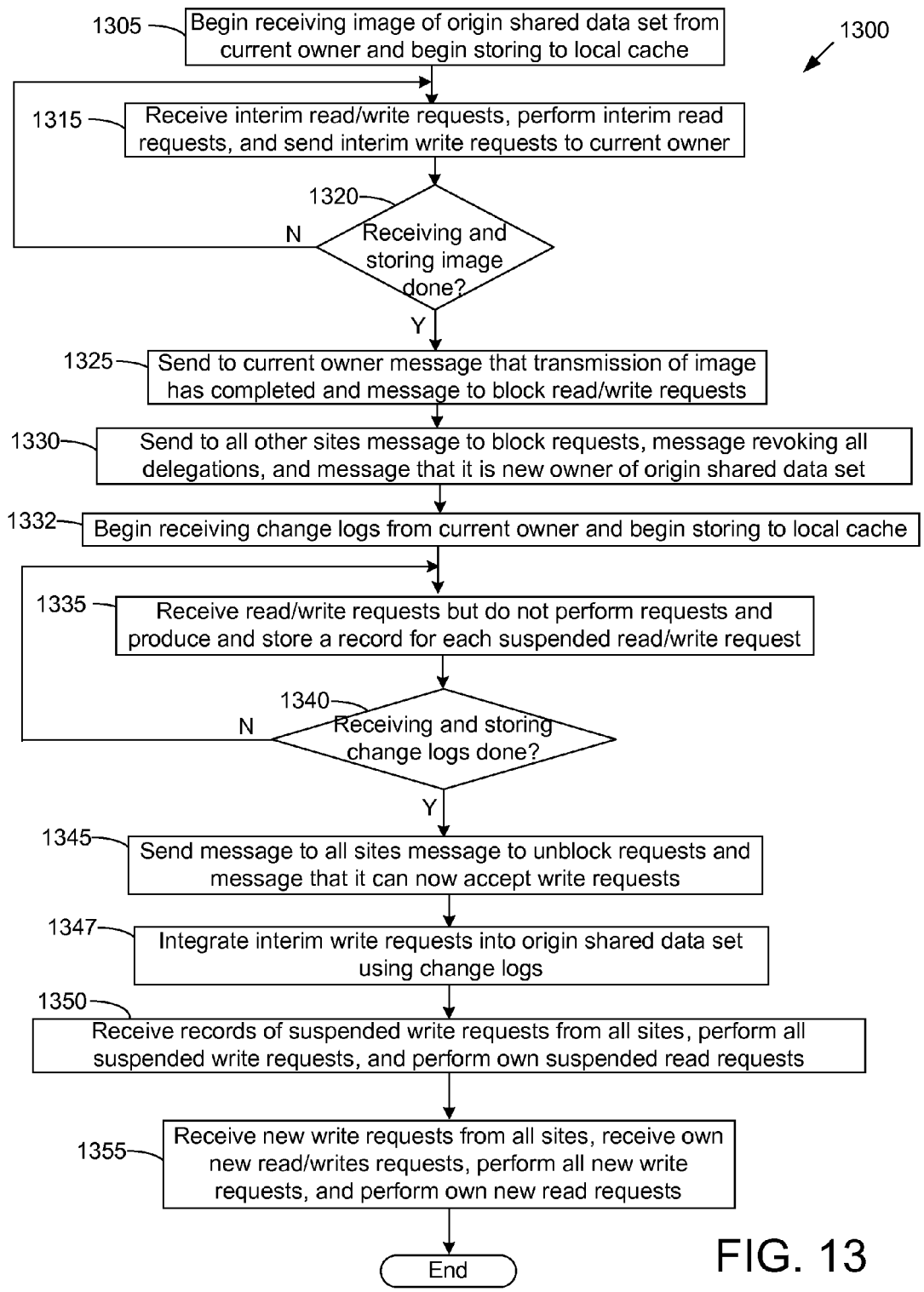
FIG. 13 is a flowchart of a new owner migration method for migrating ownership of the origin shared data set.

FIG. 13 is a flowchart of a new owner migration method 1300 for migrating ownership of the origin shared data set 430 from a current owner site to a new owner site in a shared data set environment 400. In some embodiments, the method 1300 is implemented by software or hardware. In some embodiments, the steps of method 1300 are performed by various software components that reside on the new owner site. For example, steps of the method 1300 may be performed by the new owner operating system 330 and new owner migration module 360 residing and executing on the new owner storage system 120. The various software components on the new owner site may work in conjunction with various software components (such as operating systems 330 and migration modules 360) that reside on the current owner site and other sites to migrate ownership of the origin shared data set 430 to the new owner site. The order and number of steps of the method 1300 are for illustrative purposes only and, in other embodiments, a different order and/or number of steps are used.

The method 1300 begins when it begins receiving (at 1305) an image ($I_M$) 1005 of the origin shared data set 430 from the current owner site at time t0 and begins storing the image ($I_M$) 1005 to local cache 140. The method then begins receiving (at 1315) interim read/write requests to the origin shared data set 430, performing the received interim read requests, and sending the received interim write requests to the current owner site. The method 1300 then determines (at 1320) whether receiving and storing of the image ($I_M$) 1005 to local cache 140 has completed. If not, the method continues at step 1315 where it continues to receive interim read/write requests. If so, transmission of the image ($I_M$) 1005 has completed at time t1 and the method continues at step 1325.

At step 1325, the method sends a transmission-complete message to the current owner site that transmission of the image ($I_M$) is complete and a block message to block/suspend all read/write requests. The method also sends (at 1330) to all other sites the block message to block/suspend all read/write requests, a "delegation" message that all delegation indicators held by the site are revoked, and a "new-owner" message that it is the new owner site of the origin shared data set 430. Note that the above messages may comprise a single message. The method 1300 begins receiving (at 1332) the set of change logs from the current owner site and storing the change logs to the local cache 140.

The method 1300 also begins to suspend its own received read/write requests by receiving (at 1335) read/write requests but not performing the read/write requests. For each received read/write request, the method produces and stores (at 1335) a record of the suspended read/write request. The method 1300 then determines (at 1340) whether receiving and storing of the set of change logs to local cache 140 has completed. If not, the method continues at step 1335 where it continues to receive suspended read/write requests. If so, transmission of the change logs has completed at time t2 and the method continues at step 1345.

At step 1345, the method sends to all sites an unblock message to unblock read/write requests and an accepting-writes message that it can now accept write requests to the shared data set. The method begins to integrate (at 1347) interim write requests into the origin shared data set 430 using the change logs. The method begins to receive (at 1350) records of suspended write requests from all sites, to perform all suspended write requests, and to perform its own suspended read requests. The method also begins to receive (at 1355) new write requests from all sites, to receive its own new read/writes requests, to perform all new write requests, and to perform its own new read requests. In some embodiments, the method integrates or performs each write request in chronological order. The method 1300 then ends.

Figure 14:
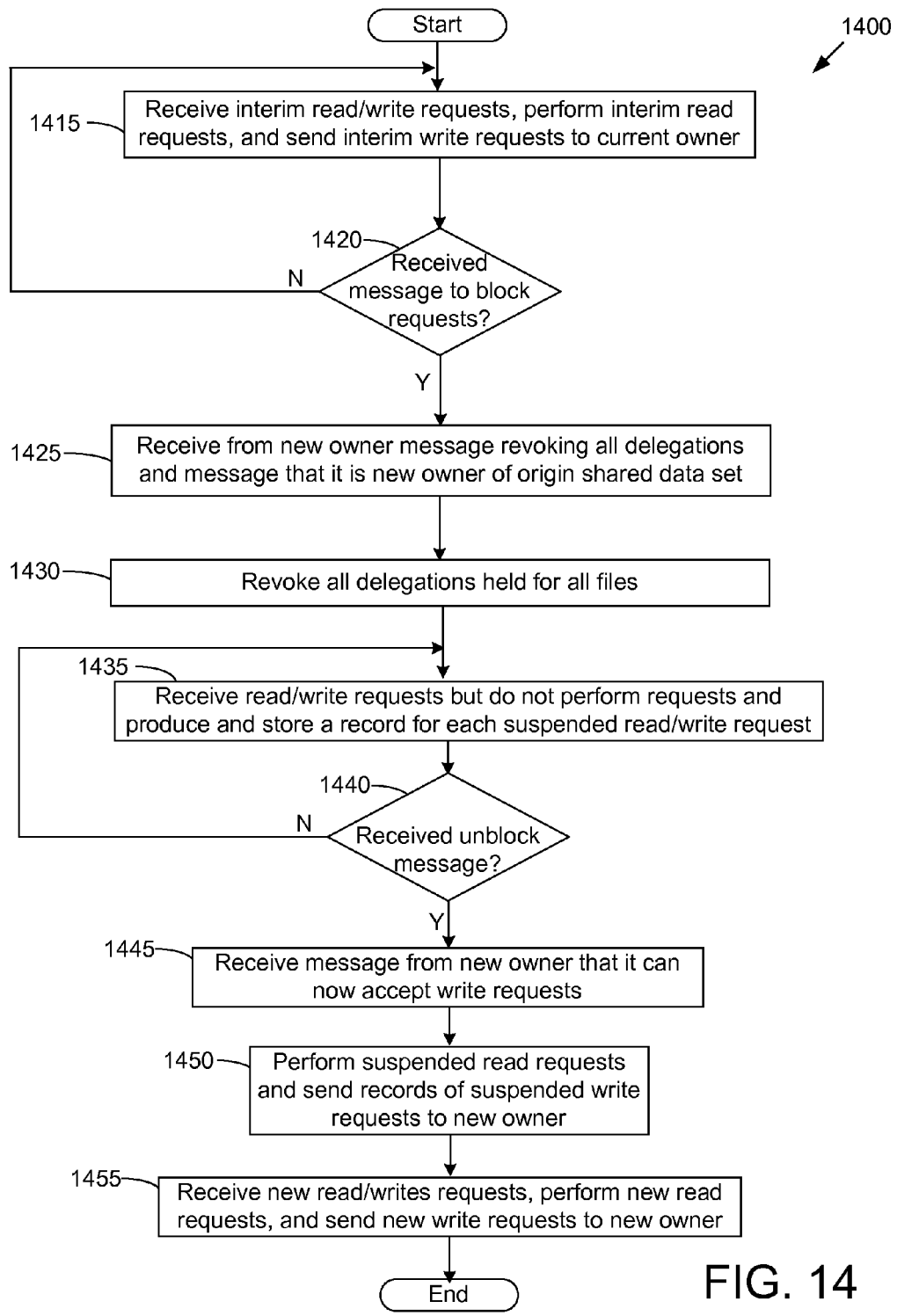
FIG. 14 is a flowchart of a remote migration method for migrating ownership of the origin shared data set.

FIG. 14 is a flowchart of a remote migration method 1400 for migrating ownership of the origin shared data set 430 from a current owner site to a new owner site in a shared data set environment 400. In some embodiments, the method 1400 is implemented by software or hardware. In some embodiments, the steps of method 1400 are performed by various software components that reside on a remote site that is not the current owner site or the new owner site. For example, steps of the method 1400 may be performed by the remote operating system 330 and remote migration module 360 residing and executing on the remote storage system 120. The various software components on the remote site may work in conjunction with various software components (such as operating systems 330 and migration modules 360) that reside on the current owner site and the new owner site to migrate ownership of the origin shared data set 430 to the new owner site. The order and number of steps of the method 1400 are for illustrative purposes only and, in other embodiments, a different order and/or number of steps are used.

The method then begins at time t0 when it receives (at 1415) interim read/write requests to the origin shared data set 430, performs the received interim read requests, and sends the received interim write requests to the current owner site. The method 1400 then determines (at 1420) whether a block message has been received from the new owner site to block/suspend all read/write requests. If not, the method continues at step 1415 where it continues to receive interim write requests. If so, the method also receives (at 1425) from the new owner site a delegation message revoking all delegations for all files and a message that it is the new owner site of origin shared data set 430. Note that the block and delegation messages may comprise a single message.

In response to the received messages, the method revokes (at 1430) all delegations for all files held by the remote site (e.g., by modifying the delegation information in the cache file 370 to indicate that all delegations have been revoked for all files). The method 1400 also begins to suspend received read/write requests by receiving (at 1435) read/write requests but not performing the read/write requests. For each received read/write request, the method 1400 produces and stores (at 1435) a record of the suspended read/write request.

The method 1400 then determines (at 1440) whether an unblock message has been received from the new owner site to unblock received read/write requests. If not, the method continues at step 1435 where it continues to receive read/write requests and produce records of the suspended requests. If the unblock message has been received (at 1440-Yes), the method stops suspending read/write requests at time t2. The method also receives (at 1445) an accepting-writes message from the new owner site that it can now accept write requests to the shared data set. The method begins to perform (at 1450) its suspended read requests (using the stored records of the suspended read requests) and send records of its suspended write requests to the new owner site. The method also begins to receive (at 1455) new read/write requests to the shared data set, perform the new read requests, and send the new write requests ($W_N$) 1035 to the new owner site. The method 1400 then ends.

By migrating ownership of the shared data set from a current owner site (that may be receiving a relatively low number of read/write requests, e.g., after business hours) to a new owner site (that may presently be receiving a relatively high number of read/write requests, e.g., during business hours), a higher number of read or write requests may be performed locally, without requiring access to a remote storage system site. As such, the overall read and write latency among the distributed sites may be reduced since the site having the higher volume of read/write requests will typically have ownership of the shared data set. Also, as described above, during the migration method access requests from clients (such as applications 230 executing on the server systems) are continued to be received and processed at each site during the change of ownership of the shared data set. As such, the migration method also provides to the clients a seamless and invisible transfer of ownership of the shared data set that does not require modification of the clients' operations or submittal of access requests.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for caching data in a plurality of storage systems, each storage system accessing a same shared data set comprising a set of storage objects, each storage object having an associated set of attributes that describe the storage object, the system comprising:

an owner storage system configured for:
  storing the shared data set; and
  generating and transmitting a first image of the shared data set to a remote storage system over a network; and
the remote storage system configured for:
  receiving and storing the first image of the shared data set;
  receiving a read request for a first data of a first storage object in the shared data set;
  sending an attribute request to the owner storage system for only owner attributes of the first storage object;
  receiving only the owner attributes of the first storage object and no data of the first storage object from the owner storage system;
  retrieving remote attributes of the first storage object from the first image;
  upon determining that the owner and remote attributes of the first storage object match:
  retrieving the first data of the first storage object from the first image;
  storing first information indicating that the owner and remote attributes of the first storage object match;
  receiving a read request for a second data of the first storage object;
  using the first information to determine that the owner and remote attributes of the first storage object match; and
  retrieving the second data of the first storage object from the first image, wherein the set of attributes that describe a storage object comprise information indicating when the storage object was last modified.

2. The system of claim 1, wherein the remote storage system is further configured for, upon determining that the owner and remote attributes of the first storage object do not match:
  sending a read request to the owner storage system for the first data from the first storage object;
  storing first information indicating that the owner and remote attributes of the first storage object do not match;
  receiving a read request for a second data of the first storage object;
  using the first information to determine that the owner and remote attributes of the first storage object do not match; and
  sending a read request to the owner storage system for the second data from the first storage object.

3. The system of claim 1, wherein the owner storage system is further configured for:
  generating and transmitting subsequent images of the shared data set to the remote storage system over the network, wherein a subsequent image may comprise changes to the shared data set since a previous image was generated, wherein the generating and transmitting are performed at predetermined time intervals automatically without human initiation or intervention.

4. The system of claim 1, wherein:
  an attribute request for a storage object comprises a read request specifying no block range or a zero block range of a storage object which causes a return of the attributes of the storage object and no data of the storage object.

5. A method for caching data in a plurality of storage systems, each storage system accessing a same shared data set comprising a set of storage objects, each storage object having an associated set of attributes that describe the storage object, the method comprising:
  storing the shared data set at an owner storage system;
  generating and transmitting a first image of the shared data set to a remote storage system over a network;

receiving and storing the first image of the shared data set to the remote storage system;
receiving, at the remote storage system, a read request for a first data of a first storage object in the shared data set;
sending an attribute request to the owner storage system for only owner attributes of the first storage object;
receiving, at the remote storage system, only the owner attributes of the first storage object and no data of the first storage object from the owner storage system;
retrieving, at the remote storage system, remote attributes of the first storage object from the first image;
upon determining, at the remote storage system, that the owner and remote attributes of the first storage object match:
  retrieving the first data of the first storage object from the first image;
  storing first information indicating that the owner and remote attributes of the first storage object match;
  receiving, at the remote storage system, a read request for a second data of the first storage object;
  using the first information to determine that the owner and remote attributes of the first storage object match; and
  retrieving the second data of the first storage object from the first image, wherein the set of attributes that describe a storage object comprise information indicating when the storage object was last modified.

6. The method of claim 5, further comprising, upon determining that the owner and remote attributes of the first storage object do not match:
  sending a read request to the owner storage system for the first data from the first storage object;
  storing first information indicating that the owner and remote attributes of the first storage object do not match;
  receiving, at the remote storage system, a read request for a second data of the first storage object;
  using the first information to determine that the owner and remote attributes of the first storage object do not match; and
  sending a read request to the owner storage system for the second data from the first storage object.

7. The method of claim 5, further comprising:
  generating and transmitting subsequent images of the shared data set to the remote storage system over the network, wherein a subsequent image may comprise changes to the shared data set since a previous image was generated, wherein the generating and transmitting are performed at predetermined time intervals automatically without human initiation or intervention.

8. The method of claim 5, wherein:
  an attribute request for a storage object comprises a read request specifying no block range or a zero block range of a storage object which causes a return of the attributes of the storage object and no data of the storage object.

9. A non-transitory computer readable medium having instructions stored thereon when executed by a processor, caches data in a plurality of storage systems, each storage system accessing a same shared data set comprising a set of storage objects, each storage object having an associated set of attributes that describe the storage object, the non-transitory computer readable medium comprising sets of instructions for:

storing the shared data set at an owner storage system;
generating and transmitting a first image of the shared data set to a remote storage system over a network;
receiving and storing the first image of the shared data set to the remote storage system;
receiving, at the remote storage system, a read request for a first data of a first storage object in the shared data set;
sending an attribute request to the owner storage system for only owner attributes of the first storage object;
receiving, at the remote storage system, only the owner attributes of the first storage object and no data of the first storage object from the owner storage system;
retrieving, at the remote storage system, remote attributes of the first storage object from the first image;
upon determining, at the remote storage system, that the owner and remote attributes of the first storage object match:
  retrieving the first data of the first storage object from the first image;
  storing first information indicating that the owner and remote attributes of the first storage object match;
  receiving, at the remote storage system, a read request for a second data of the first storage object;
  using the first information to determine that the owner and remote attributes of the first storage object match; and
  retrieving the second data of the first storage object from the first image, wherein the set of attributes that describe a storage object comprise information indicating when the storage object was last modified.

10. The non-transitory computer readable medium of claim 9, further comprising sets of instructions for:
  upon determining that the owner and remote attributes of the first storage object do not match:
    sending a read request to the owner storage system for the first data from the first storage object;
    storing first information indicating that the owner and remote attributes of the first storage object do not match;
    receiving, at the remote storage system, a read request for a second data of the first storage object;
    using the first information to determine that the owner and remote attributes of the first storage object do not match; and
    sending a read request to the owner storage system for the second data from the first storage object.

11. The non-transitory computer readable medium of claim 9, further comprising sets of instructions for:
  generating and transmitting subsequent images of the shared data set to the remote storage system over the network, wherein a subsequent image may comprise changes to the shared data set since a previous image was generated, wherein the generating and transmitting are performed at predetermined time intervals automatically without human initiation or intervention.

12. The non-transitory computer readable medium of claim 9, wherein:
  an attribute request for a storage object comprises a read request specifying no block range or a zero block range of a storage object which causes a return of the attributes of the storage object and no data of the storage object.

* * * * *